(12) United States Patent
Gillespie et al.

(10) Patent No.: US 11,609,178 B2
(45) Date of Patent: Mar. 21, 2023

(54) APPARATUS FOR ANALYSING A LIQUID SAMPLE COMPRISING PARTICLES

(71) Applicant: UNIVERSITY COURT OF THE UNIVERSITY OF ST ANDREWS, Fife (GB)

(72) Inventors: Stephen H. Gillespie, Fife (GB); Robert J. H. Hammond, Fife (GB)

(73) Assignee: UNIVERSITY COURT OF THE UNIVERSITY OF ST ANDREWS, Fife (GB)

( * ) Notice: Subject to any disclaimer, the term of this patent is extended or adjusted under 35 U.S.C. 154(b) by 65 days.

(21) Appl. No.: 16/976,333

(22) PCT Filed: Feb. 27, 2019

(86) PCT No.: PCT/GB2019/050537
§ 371 (c)(1),
(2) Date: Aug. 27, 2020

(87) PCT Pub. No.: WO2019/166799
PCT Pub. Date: Sep. 6, 2019

(65) Prior Publication Data
US 2021/0072148 A1 Mar. 11, 2021

(30) Foreign Application Priority Data
Feb. 27, 2018 (GB) ...................................... 1803212
Mar. 28, 2018 (GB) ...................................... 1804958

(51) Int. Cl.
*G01N 21/03* (2006.01)
*G01N 21/51* (2006.01)

(52) U.S. Cl.
CPC ....... *G01N 21/0303* (2013.01); *G01N 21/031* (2013.01); *G01N 21/51* (2013.01);
(Continued)

(58) Field of Classification Search
CPC ...... G01N 21/76; G01N 1/10; G01N 33/5438; G01N 2001/315; G01N 21/0303;
(Continued)

(56) References Cited

U.S. PATENT DOCUMENTS 3,826,574 A * 7/1974 Brown, Jr. ............. G01N 21/51
250/226
5,164,597 A 11/1992 Lodder
(Continued)

FOREIGN PATENT DOCUMENTS

EP 2261641 12/2010
EP 2261641 A2 * 12/2010 ........... G01N 21/645
(Continued)

OTHER PUBLICATIONS

International Search Report and Written Opinion for International (PCT) Patent Application No. PCT/GB2019/050537, dated Apr. 6, 2019, 26 pages.

*Primary Examiner* — Michael P Stafira
(74) *Attorney, Agent, or Firm* — Sheridan Ross P.C.

(57) ABSTRACT

An apparatus for analysing a liquid sample comprising particles, comprises: a first chamber (12) and a second chamber (14), and an optical path between the first chamber (12) and the second chamber (14), wherein: the first chamber (12) is a sample chamber comprising: a sample space for receiving the sample; a light input (24) for input of light into the first chamber (12) for interaction with the sample; and an exit aperture (26) arranged for scattered and/or reflected light to pass from the first chamber via the optical path to the second chamber (14); the second chamber (14) is a detection chamber comprising: an input aperture (28) for receiving light from the optical path; and a detector (25) for detecting, or a detector aperture for receiving, light to be detected; wherein the first chamber (12) and the second chamber (14) provide at least one light integrating volume, and wherein
(Continued)

the first chamber (12) is configured such that in operation the liquid sample is present in the first chamber (12) and isolated from the second chamber (14).

16 Claims, 27 Drawing Sheets

(52) U.S. Cl.
CPC .............. *G01N 2021/0357* (2013.01); *G01N 2021/513* (2013.01); *G01N 2201/0245* (2013.01); *G01N 2201/0415* (2013.01); *G01N 2201/065* (2013.01)

(58) Field of Classification Search
CPC ............. G01N 2021/6439; G01N 1/38; G01N 2458/30; G01N 27/30; G01N 21/03; G01N 27/3272; G01N 21/6428; G01N 21/51; G01N 33/582; G01N 2021/6482; G01N 21/645; G01N 35/1097; G01N 21/64; G01N 21/643; G01N 2021/0346; G01N 21/05; G01N 21/78; G01N 21/253; G01N 21/8507; G01N 2203/0089; G01N 3/32; G01N 33/4833; G01N 2015/0693; G01N 21/6452; G01N 21/6458; G01N 33/487; G01N 21/8483; G01N 1/20; G01N 2001/1031; G01N 2021/054; G01N 2021/6417; G01N 21/69; G01N 33/24; G01N 1/286; G01N 21/658; G01N 21/77; G01N 27/44704; G01N 35/00009; G01N 1/34; G01N 1/42; G01N 15/06; G01N 21/031; G01N 21/552; G01N 21/65; G01N 33/48; G01N 15/1475; G01N 2001/021; G01N 2015/1497; G01N 2021/513; G01N 2035/00881; G01N 21/94; G01N 2201/0415; G01N 33/54373; G01N 35/00871; G01N 1/16; G01N 1/2035; G01N 15/1404; G01N 15/1434; G01N 2015/003; G01N 2015/0053; G01N 2015/0687; G01N 2015/1006; G01N 2035/0481; G01N 21/3504; G01N 21/85; G01N 2201/062; G01N 2203/0204; G01N 2203/0246; G01N 2203/0476; G01N 2291/0256; G01N 27/06; G01N 27/44739; G01N 33/0044; G01N 33/18; G01N 33/2888; G01N 35/00; G01N 35/04; G01N 1/14; G01N 1/2813; G01N 1/405; G01N 15/0656; G01N 2021/6421; G01N 2021/6484; G01N 21/07; G01N 21/3577; G01N 21/3586; G01N 27/44743; G01N 29/036; G01N 1/18; G01N 1/28; G01N 2001/2071; G01N 2001/4088; G01N 2015/0662; G01N 2021/3595; G01N 2021/4707; G01N 2021/6471; G01N 2021/8411; G01N 2035/00158; G01N 21/00; G01N 21/0317; G01N 21/274; G01N 2201/0231; G01N 2201/1211; G01N 2201/127; G01N 2203/0242; G01N 2203/0274; G01N 33/0036; G01N 33/2858; G01N 33/2876; G01N 33/491; G01N 33/558; G01N 1/04; G01N 15/042; G01N 2001/028; G01N 2001/045; G01N 2001/284; G01N 2001/2886; G01N 2015/045; G01N 2021/6419; G01N 2033/245; G01N 21/0332; G01N 21/276; G01N 21/33; G01N 21/82; G01N 2201/06113; G01N 2201/0697; G01N 2201/0698; G01N 23/2202; G01N 27/3274; G01N 27/447; G01N 33/0009; G01N 33/287; G01N 33/66; G01N 35/0098; G01N 35/0099; G01N 9/00; G01N 1/12; G01N 1/24; G01N 1/26; G01N 1/30; G01N 1/31; G01N 15/0227; G01N 2001/1454; G01N 2015/1493; G01N 2021/7786; G01N 2035/00326; G01N 2035/0093; G01N 21/01; G01N 21/47; G01N 21/6456; G01N 21/6486; G01N 2201/0245; G01N 2291/02818; G01N 27/44773; G01N 30/88; G01N 33/4905; G01N 33/54326; G01N 33/54366; G01N 33/80; G01N 35/00069; G01N 35/0092; G01N 35/085; G01N 35/1004; G01N 35/1095; G01N 15/05; G01N 15/14; G01N 2015/0233; G01N 2015/1454; G01N 2021/0328; G01N 2021/1765; G01N 2021/825; G01N 21/17; G01N 21/6408; G01N 21/6454; G01N 21/648; G01N 2201/0221; G01N 2201/08; G01N 23/20; G01N 27/026; G01N 27/26; G01N 27/307; G01N 33/04; G01N 33/5308; G01N 33/54393; G01N 33/86; G01N 35/1016; G01N 37/00; G01N 1/2214; G01N 1/2226; G01N 1/312; G01N 1/4077; G01N 15/0211; G01N 15/1459; G01N 15/1463; G01N 2015/0065; G01N 2021/035; G01N 2021/0357; G01N 2021/1772; G01N 2021/3137; G01N 2021/317; G01N 2021/6441; G01N 2021/7796; G01N 2021/8829; G01N 2033/0091; G01N 2035/00148; G01N 2035/00237; G01N 2035/0441; G01N 21/21; G01N 21/359; G01N 21/39; G01N 21/8806; G01N 2201/024; G01N 2201/04; G01N 2201/0632; G01N 2201/0826; G01N 2203/0044; G01N 2203/0085; G01N 2203/0256; G01N 2223/307; G01N 2223/418; G01N 2291/0423; G01N 23/00; G01N 23/2204; G01N 23/225; G01N 25/00; G01N 27/02; G01N 27/327; G01N 2800/50; G01N 29/022; G01N 33/02; G01N 33/2823; G01N 33/4875; G01N 33/49; G01N 33/53; G01N 33/5302; G01N 33/6854; G01N 33/948; G01N 35/1011; G01N 7/04; G01N 9/08; G01N 9/20; G01N 1/08; G01N 1/36; G01N 1/4044; G01N 11/00; G01N 15/1484; G01N 2001/1093; G01N 2011/0066; G01N 2013/003; G01N 2015/0076; G01N 2015/1409; G01N 2015/149; G01N 2021/1727; G01N 2030/0095; G01N 2030/8854; G01N 2035/00207; G01N 2035/00346; G01N 2035/00514; G01N 21/25; G01N 21/272; G01N 2291/0255; G01N 2333/4603; G01N 27/72; G01N 29/02; G01N 29/222; G01N 29/2437; G01N 30/466; G01N 30/8693; G01N 33/4915; G01N 33/493; G01N 33/5044; G01N 33/5088; G01N 33/569; G01N 35/02; G01N 35/028;

G01N 5/025; G01N 7/10; G01N 1/02; G01N 1/22; G01N 1/40; G01N 1/4005; G01N 15/0826; G01N 15/1468; G01N 2001/1427; G01N 2001/205; G01N 2001/386; G01N 2015/0092; G01N 2015/0216; G01N 2015/1447; G01N 2015/1452; G01N 2015/1472; G01N 2021/058; G01N 2021/6476; G01N 2021/7773; G01N 2021/8528; G01N 2035/00277; G01N 2035/103; G01N 2035/1032; G01N 21/27; G01N 21/453; G01N 21/455; G01N 2223/076; G01N 2291/018; G01N 23/04; G01N 23/20058; G01N 23/223; G01N 2333/165; G01N 24/081; G01N 24/085; G01N 2469/20; G01N 2474/20; G01N 27/22; G01N 27/3276; G01N 27/3278; G01N 27/745; G01N 29/028; G01N 33/08; G01N 33/2841; G01N 33/48735; G01N 33/5002; G01N 33/5029; G01N 33/56983; G01N 33/57407; G01N 33/577; G01N 9/002; G01N 11/04; G01N 15/08; G01N 2001/1006; G01N 2001/1025; G01N 2001/1418; G01N 2001/3032; G01N 2001/366; G01N 2001/4016; G01N 2015/0069; G01N 2015/0073; G01N 2015/008; G01N 2015/0084; G01N 2015/0681; G01N 2015/0846; G01N 2015/0866; G01N 2015/1402; G01N 2021/0118; G01N 2021/0321; G01N 2021/391; G01N 2033/0093; G01N 2035/00089; G01N 2035/00306; G01N 2035/00356; G01N 2035/00366; G01N 2035/00544; G01N 2035/0412; G01N 2035/0462; G01N 2035/0465; G01N 2035/0472; G01N 21/3563; G01N 22/00; G01N 2201/063; G01N 2223/3305; G01N 2291/023; G01N 24/08; G01N 2405/04; G01N 25/4846; G01N 25/486; G01N 27/08; G01N 27/221; G01N 27/226; G01N 27/333; G01N 27/416; G01N 2800/12; G01N 29/04; G01N 29/223; G01N 29/28; G01N 31/22; G01N 33/182; G01N 33/2025; G01N 33/22; G01N 33/241; G01N 33/48714; G01N 33/492; G01N 33/5011; G01N 33/5304; G01N 33/54306; G01N 33/56911; G01N 33/56972; G01N 33/57492; G01N 33/57496; G01N 33/98; G01N 35/00584; G01N 35/026; G01N 35/08; G01N 35/1002; G01N 2201/065; G01N 21/474; G01N 21/31; G01N 21/255; G01N 21/55; G01N 21/59; G01N 21/4738; G01N 21/9501; G01N 21/57; G01N 2201/0627; G01N 21/87; G01N 21/3151; G01N 21/251; G01N 2021/8427; G01N 21/8422; G01N 21/49; G01N 2021/556; G01N 2201/061; G01N 21/9081; G01N 33/587; G01N 21/314; G01N 21/9072; G01N 2021/6469; G01N 15/082; G01N 2021/3144; G01N 2033/0096; G01N 21/4795; G01N 23/2273; G01N 21/4785; G01N 2201/0642; G01N 2201/129; G01N 2021/4742; G01N 21/278; G01N 30/7206; G01N 33/00; G01N 21/958; G01N 2021/6491; G01N 21/532; G01N 21/6489; G01N 21/1702; G01N 21/9506; G01N 21/956; G01N 2021/3155; G01N 2021/4709; G01N 21/35; G01N 21/4788; G01N 21/7743; G01N 21/8901; G01N 33/54313; G01N 2021/479; G01N 2021/558; G01N 21/63; G01N 21/896; G01N 2021/4735; G01N 2458/00; G01N 2021/0112; G01N 21/211; G01N 21/64; G01N 2201/12; G01N 2201/0612; G01N 21/8851; G01N 2021/1793; G01N 21/554; G01N 21/636; G01N 2015/0046; G01N 21/15; G01N 21/86; G01N 21/538; G01N 2201/0625; G01N 2021/4757; G01N 21/53; G01N 21/534; G01N 21/95; G01N 2201/0696; G01N 33/4925; G01N 2021/555; G01N 2021/8477; G01N 2021/8592; G01N 2021/8864; G01N 21/19; G01N 21/45; G01N 21/66; G01N 21/763; G01N 2201/0833; G01N 33/74; G01N 15/0205; G01N 2021/478; G01N 2021/651; G01N 21/8803; G01N 21/9505; G01N 2201/064; G01N 2201/068; G01N 2333/726; G01N 2500/02; G01N 30/74; G01N 2021/0389; G01N 2021/152; G01N 2021/3148; G01N 21/1717; G01N 21/3554; G01N 2201/0634; G01N 2201/0635; G01N 2201/0655; G01N 2201/0668; G01N 2500/04; G01N 33/346; G01N 33/56966; G01N 33/583; G01N 33/6845; G01N 2015/0038; G01N 2021/3568; G01N 2021/399; G01N 2021/8887; G01N 21/293; G01N 2201/0616; G01N 2201/0637; G01N 2201/103; G01N 2201/12753; G01N 33/54386; G01N 33/585; G01N 33/6872; G01N 2021/4761; G01N 2021/575; G01N 21/11; G01N 21/553; G01N 2201/12723; G01N 33/52; G01N 15/02; G01N 2021/3181; G01N 2021/4769; G01N 2021/4783; G01N 2021/8466; G01N 2021/8841; G01N 2035/00435; G01N 2035/1034; G01N 21/93; G01N 2201/104; G01N 2201/1045; G01N 33/525; G01N 33/54346; G01N 33/548; G01N 15/0266; G01N 15/1436; G01N 2021/052; G01N 2021/1725; G01N 2021/1742; G01N 2021/216; G01N 2021/3129; G01N 2021/4702; G01N 2021/655; G01N 2035/1037; G01N 21/3518; G01N 2201/0691; G01N 35/1065; G01N 1/2208; G01N 1/44; G01N 15/0255; G01N 15/1031; G01N 2015/0277; G01N 2015/0294; G01N 2015/1043; G01N 2021/151; G01N 2021/1797; G01N 2021/845; G01N 21/8903; G01N 2201/06146; G01N 2201/0622; G01N 2201/0639; G01N 2201/125; G01N 2201/12746; G01N 27/44721; G01N 31/226; G01N 33/0098; G01N 33/553; G01N 2015/1486; G01N 2021/158; G01N 2021/1787; G01N 2021/1795; G01N 2021/4714; G01N

2021/4754; G01N 2021/635; G01N 2021/6467; G01N 2021/6478; G01N 2021/653; G01N 2021/8618; G01N 2021/8928; G01N 2030/621; G01N 2030/746; G01N 21/23; G01N 21/67; G01N 21/71; G01N 21/84; G01N 21/95607; G01N 2201/06153; G01N 2201/0623; G01N 2201/0636; G01N 2201/0695; G01N 2201/121; G01N 2201/1293; G01N 27/041; G01N 33/0057; G01N 33/025; G01N 2021/0106; G01N 2021/0367; G01N 2021/1736; G01N 2021/1753; G01N 2021/217; G01N 2021/3133; G01N 2021/4711; G01N 2021/4726; G01N 2021/551; G01N 2021/6423; G01N 2021/6463; G01N 2021/656; G01N 2021/8416; G01N 2021/8825; G01N 2021/9511; G01N 2030/027; G01N 2035/1062; G01N 21/256; G01N 21/5907; G01N 21/61; G01N 21/88; G01N 21/95684; G01N 2201/0407; G01N 2201/0628; G01N 2201/0633; G01N 2201/067; G01N 2201/0806; G01N 2201/126; G01N 2201/1296; G01N 29/2418; G01N 17/004; G01N 2015/0222; G01N 2021/0307; G01N 2021/0385; G01N 2021/1704; G01N 2021/434; G01N 2021/4716; G01N 2021/4752; G01N 2021/4733; G01N 2021/4792; G01N 2021/6493; G01N 2021/8663; G01N 2021/8816; G01N 2021/8883; G01N 2021/9546; G01N 21/43; G01N 21/73; G01N 21/892; G01N 21/954; G01N 2201/022; G01N 2201/0236; G01N 2201/06; G01N 2201/06126; G01N 2201/0621; G01N 2201/0631; G01N 2201/0813; G01N 2201/124; G01N 2333/4727; G01N 33/1826; G01N 33/343; G01N 33/38; G01N 33/50; G01N 33/5005; G01N 33/5041; G01N 15/1429; G01N 15/1456; G01N 2001/2276; G01N 2015/03; G01N 2021/0168; G01N 2021/0314; G01N 2021/0325; G01N 2021/0335; G01N 2021/154; G01N 2021/1712; G01N 2021/1731; G01N 2021/1738; G01N 2021/1744; G01N 2021/1776; G01N 2021/1782; G01N 2021/214; G01N 2021/3122; G01N 2021/3166; G01N 2021/3177; G01N 2021/451; G01N 2021/458; G01N 2021/8438; G01N 2021/855; G01N 2021/869; G01N 2021/8838; G01N 2021/8917; G01N 2021/936; G01N 2021/9513; G01N 2035/00039; G01N 2035/00118; G01N 21/171; G01N 21/412; G01N 21/7703; G01N 21/7746; G01N 21/89; G01N 21/90; G01N 21/9515; G01N 2201/0618; G01N 2201/0662; G01N 2201/069; G01N 2201/102; G01N 2201/1087; G01N 2223/1016; G01N 2291/02475; G01N 2291/0427; G01N 29/0672; G01N 33/246; G01N 33/442; G01N 33/543; G01N 33/588; G01N 35/00029; G01N 1/06; G01N 15/0637; G01N 15/147; G01N 2015/0042; G01N 2021/0378; G01N 2021/3196; G01N 2021/4704; G01N 2021/4728; G01N 2021/4764; G01N 2021/4771; G01N 2021/516; G01N 2021/557; G01N 2021/6432; G01N 2021/6434; G01N 2021/7736; G01N 2021/8609; G01N 2021/8845; G01N 2021/8848; G01N 2021/8893; G01N 2021/8908; G01N 2021/95676; G01N 2021/9583; G01N 2033/0081; G01N 2035/00524; G01N 21/3103; G01N 21/41; G01N 21/5911; G01N 21/62; G01N 21/6445; G01N 21/718; G01N 21/8916; G01N 21/894; G01N 21/9054; G01N 21/9503; G01N 21/95692; G01N 2201/06193; G01N 2201/0675; G01N 2201/088; G01N 2223/419; G01N 2223/612; G01N 2291/02836; G01N 2291/02872; G01N 23/046; G01N 23/207; G01N 2333/59; G01N 25/72; G01N 27/125; G01N 27/127; G01N 27/4141; G01N 27/4146; G01N 27/44791; G01N 29/0681; G01N 3/02; G01N 30/0005; G01N 30/6095; G01N 33/0018; G01N 33/004; G01N 33/12; G01N 33/14; G01N 33/1813; G01N 33/4972; G01N 33/542; G01N 33/566; G01N 33/574; G01N 33/946; G01N 33/9486; G01N 35/10; G01N 1/2252; G01N 1/2273; G01N 1/4022; G01N 13/00; G01N 15/0612; G01N 15/0618; G01N 15/0625; G01N 15/1427; G01N 17/00; G01N 2001/4033; G01N 2013/006; G01N 2015/0026; G01N 2015/0096; G01N 2015/086; G01N 2015/1062; G01N 2015/1477; G01N 2021/0339; G01N 2021/135; G01N 2021/1734; G01N 2021/174; G01N 2021/1748; G01N 2021/1757; G01N 2021/213; G01N 2021/218; G01N 2021/3513; G01N 2021/3536; G01N 2021/394; G01N 2021/4745; G01N 2021/4747; G01N 2021/475; G01N 2021/6465; G01N 2021/6473; G01N 2021/772; G01N 2021/8455; G01N 2021/8812; G01N 2021/8822; G01N 2030/047; G01N 2030/146; G01N 2035/00198; G01N 2035/00376; G01N 21/13; G01N 21/3559; G01N 21/3581; G01N 21/6404; G01N 21/9009; G01N 21/9036; G01N 21/909; G01N 21/952; G01N 2201/0216; G01N 2201/0253; G01N 2201/0638; G01N 2201/0683; G01N 2201/084; G01N 2201/0846; G01N 2201/1042; G01N 2201/1047; G01N 2333/70578; G01N 2333/96433; G01N 25/20; G01N 27/4166; G01N 2800/28; G01N 3/10; G01N 30/02; G01N 30/06; G01N 30/14; G01N 30/34; G01N 33/0006; G01N 33/483; G01N 33/5008; G01N 33/502; G01N 33/533; G01N 35/025; G01N 35/1009

See application file for complete search history.

(56) References Cited

U.S. PATENT DOCUMENTS

| | | | |
|---|---|---|---|
| 9,677,988 B1* | 6/2017 | Doggett | G01N 15/0205 |
| 2015/0040689 A1* | 2/2015 | Jayne | G01N 1/2208 |
| | | | 73/863.11 |
| 2015/0160119 A1* | 6/2015 | Marshall | G01N 21/51 |
| | | | 422/534 |
| 2016/0216204 A1* | 7/2016 | Marshall | G01N 21/0303 |
| 2016/0313233 A1* | 10/2016 | Zangmeister | G01N 21/1702 |

FOREIGN PATENT DOCUMENTS

| | | | | |
|---|---|---|---|---|
| GB | 2434444 A | * | 7/2007 | G01J 3/4406 |
| GB | 2496690 A | * | 5/2013 | G01N 21/03 |
| GB | 2550602 A | * | 11/2017 | G01N 15/06 |
| WO | WO 2016/128747 | | 8/2016 | |
| WO | WO-2016128747 A1 | * | 8/2016 | C12Q 1/00 |

* cited by examiner

Diagramatic overview of the use of SLIC for the rapid diagnosis of urinary tract infection

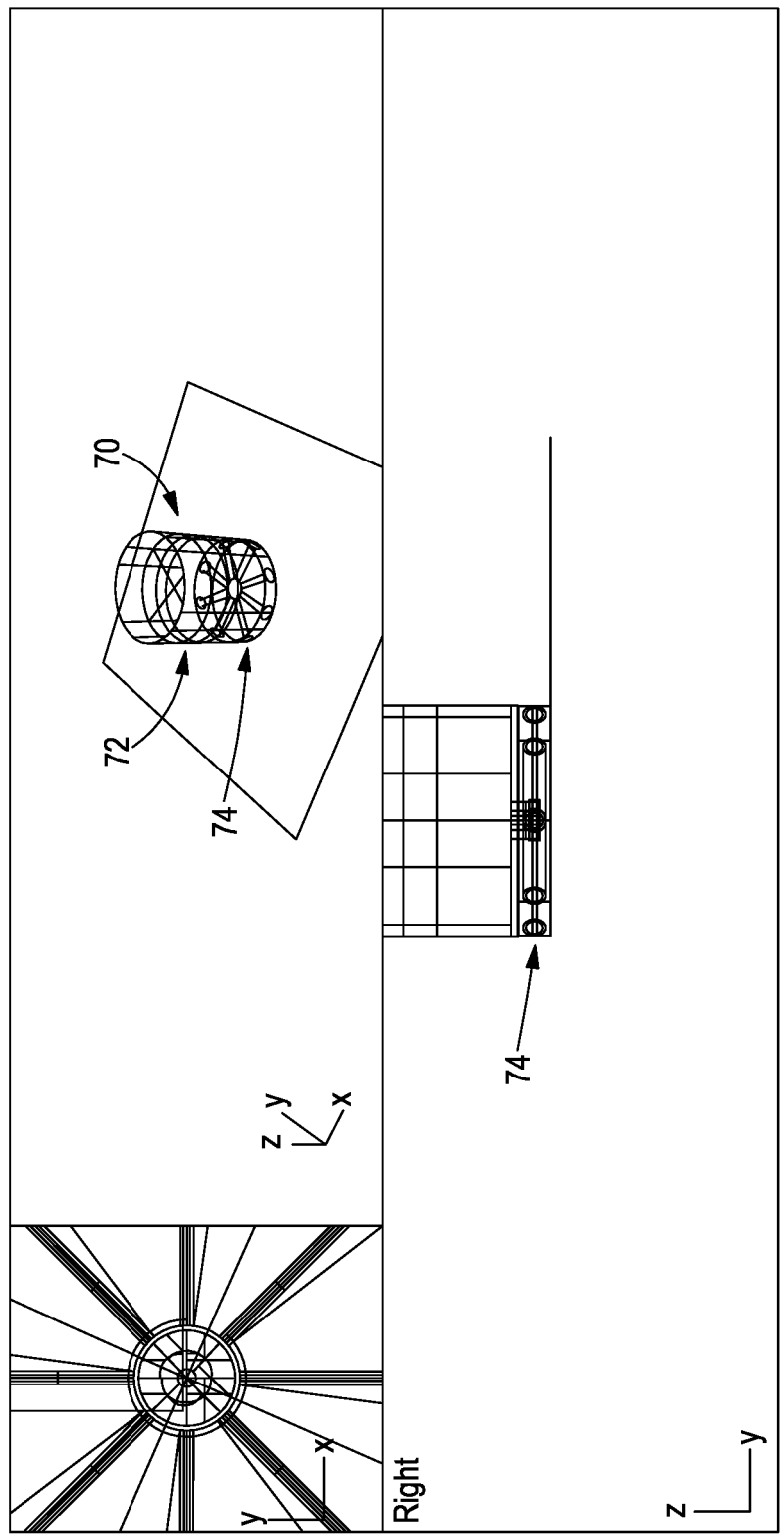

APPARATUS FOR ANALYSING A LIQUID SAMPLE COMPRISING PARTICLES

CROSS REFERENCE TO RELATED APPLICATIONS

This application is a national stage application under 35 U.S.C. 371 and claims the benefit of PCT Application No. PCT/GB2019/050537 having an international filing date of 27 Feb. 2019 which designated the United States, which PCT application claimed the benefit of Great Britain Application No. 1803212.8 filed 27 Feb. 2018, and Great Britain Application No. 1804958.5 filed 28 Mar. 2018, the disclosures of each of which are incorporated herein by reference.

INTRODUCTION

The present invention relates to a device for measuring at least one property of a sample, for example a biological sample such as bacteria, using light.

BACKGROUND

As discussed in the introductory part of WO 2016/128747, classic spectrophotometers can be used to determine optical properties of bacteria using absorption or scattering. Absorption spectrophotometers can be used to measure the relative absorbance of a sample. Absorbance is measured by comparing the intensity of light entering a sample with the intensity of light exiting the sample. A drop in light intensity indicates a quantity of light has been absorbed. This can be displayed as an arbitrary figure, typically an optical density. This can lead to an accurate count of the number of cells present in a sample.

Scattering spectrophotometers usually comprise an intense light source, such as a laser or a very bright incandescent source, and a monochromator. Light is incident on a sample and is scattered at different angles. Detectors placed at discrete intervals around a chamber collect the scattered light. Collected light in the side scattering region can be used to obtain information about granularity and light collected in the forward scattering region can be used to obtain information about the size of the particles. Overall intensity of the scattered light gives a turbidity reading and an indication of the number of particles present. In scattering spectrophotometers for measuring bacteria, the typical wavelength of the light source is 600 nm. This wavelength is the most scattered and least absorbed by a number of organic materials, such as DNA, proteins, cytochromes.

Flow cytometers can also determine properties of a sample of interest. When a sheath-flow of index matched liquid flows through a narrow tube, the liquid acts to reduce the lumen of the tube forcing cells in the liquid to pass through the tube individually. This facilitates cell counting. Laser light incident on the narrow tube is scattered as individual cells pass through. Side and forward scattering data can be recorded to give information about the size and granularity of the cells under study. Thousands of cells can pass through the beam and be measured in this way in a few seconds and in very little liquid. Whilst cytometers are useful in some applications, they are sophisticated machines that require extensive training of an operator. Safe operation also requires a regular input of reagents and this contributes to on-going running costs. The interpretation of data produced can also prove challenging.

Another method for measuring concentration of suspended particles in a liquid or gas is nephelometry. Nephelometers can be configured to use integrating spheres. In such a configuration, light is incident on a sample and may be scattered by particles in the sample before entering the integrating sphere. The scattered light is then reflected and diffused inside the integrating sphere before being detected at an exit port of the sphere. Unscattered light passes straight through the sphere and is not collected.

International Patent Application publication No. WO 2016/128747 (Hammond et al.), which is incorporated herein by reference, discloses a system for measuring a sample comprising: an integrating sphere light collector for collecting light and containing the sample; a light source for introducing light in the integrating sphere light collector, wherein the light source is operable to output light with a known modulation; a detector for detecting scattered light in the integrating sphere light collector and generating a signal indicative of the scattered light, and a lock-in amplifier operable use the known light modulation and the signal generated by the detector to provide an output for analysis. It has been found in WO 2016/128747 that the use of an integrating sphere light collector in combination with the use of modulated light and phase-sensitive detection using a lock-in amplifier can be used to monitor change of detection signal at different time points from a sample that may contain a biological material such as microbes. Using such an arrangement it has been found that the presence of microbes and their susceptibility to antibiotics or other arrangements can be determined in a rapid and convenient manner with sufficient sensitivity. In some embodiments described in WO 2016/128747 a modulated laser beam is used as a light input and passes through a sample contained in a cuvette mounted in the integrating sphere. The laser beam may pass through the sample directly to a beam dump via an exit aperture. Any light from the laser beam that is scattered by the sample is reflected within the integrating sphere and eventually received via a detector. The detection signal is modulated at the same modulation frequency as the detector and the modulated detection signal has an amplitude that is representative of the number of microbes or other particles of biological material that are present.

In practice, systems that can provide for in-field and/or high throughput testing are desirable, particularly systems that provide for one or more improved ease-of maintenance, sample handling, reliability and/or ease of use. Accurate point-of-care determination of the presence of microbes and/or the effectiveness of antibiotics, if achieved, may provide for more rapid and convenient sample testing and may, for example, avoid or defer the need for sophisticated and time-consuming laboratory testing of samples.

More rapid and/or simple and/or convenient practical testing for the presence of, and/or susceptibility to antibiotics, can lead for example to reduction of unnecessary prescribing of antibiotics or initial prescription of the incorrect antibiotics for a particular condition. Without such rapid and accurate testing, for example at point of care, it is common for antibiotics to be prescribed without detailed testing having been performed and/or in a speculate or precautionary manner. Such incorrect prescribing or overuse of antibiotics has lead to an increase of antibiotic resistance in the global population, which is widely recognised as a critical global challenge.

SUMMARY

In a first aspect there is provided a detection apparatus for analysing a sample comprising one or more particles in a liquid, for example by detecting the presence of particles in a liquid sample. The apparatus comprises a first chamber and a second chamber, and an optical path between the first chamber and the second chamber. The first chamber is a sample chamber comprising a sample space for receiving the sample, a light input for input of light into the first chamber for interaction with the sample, and an exit aperture arranged for light, for example scattered and/or reflected light, to pass from the first chamber via the optical path to the second chamber. The second chamber is a detection chamber comprising an input aperture for receiving light from the optical path, and a detector for detecting, or a detector aperture for receiving, light to be detected. The first chamber and the second chamber may provide at least one light integrating volume. In embodiments, the first chamber and the second chamber may together provide at least one integrating volume. In other words, the first chamber and the second chamber may each be configured such that scattered and/or reflected light is at least partially integrated in the chamber. The first chamber may be configured such that in operation the liquid sample is present in the first chamber and isolated from the second chamber. In embodiments, the first chamber defines a volume that is at least partially external to the volume of the second chamber. The integrating volume may be for collecting, scattering and/or diffusing light. In embodiments, the light input may comprise a light entry aperture. In embodiments, the apparatus further comprises a light source configured to provide light to the sample chamber through the light input.

The light input/light entry aperture, exit aperture, input aperture and detector aperture may each comprise sections of the first/second chamber (as the case maybe) that allow light to pass through said section. Preferably, such sections allow light to pass through substantially unaltered. In embodiments, the sections may be constructed as holes or as sections of transparent material.

The first chamber may further comprise a light beam exit port aligned with the light input and optionally leading to a beam dump.

The light input may comprise a light input port for passing the light from a light source to the first chamber.

The first chamber may comprise a light integrating chamber and the second chamber may comprise a light integrating chamber.

The apparatus may further comprise a barrier to prevent passage of the sample thereby to provide said isolation of the liquid sample from the second chamber.

The walls of the first chamber may be reflective.

The light input and the walls of the first chamber may be arranged such that in operation at least some of the light is reflected in the first chamber a plurality of times before exiting the first chamber via the exit aperture.

The first chamber may comprise an opening for insertion of the sample or for insertion of a removable sample cell. The opening may be closeable. In embodiments, the first chamber may be configured such that the opening can be closed by inserting a removable sample cell in the first chamber. In embodiments, the device may comprise a removable sample cell inserted through an opening in the first chamber, where the sample cell when inserted in the first chamber closes the opening. In embodiments, the removable sample cell may comprise a reflective surface for reflecting light in the first chamber when the sample cell is inserted in the first chamber.

The first chamber may comprise a lid, base or wall that is openable or removable to allow insertion of said sample cell and/or said sample.

The openable or removable lid, base or wall may comprise a reflective surface for reflecting light in the first chamber in operation.

The first chamber may be configured to receive a removable sample cell for containing the sample The sample cell may be configured to provide said isolation of the liquid sample from the second chamber.

The apparatus may comprise a sample cell receiving arrangement for receiving the sample cell, for example at least one guide for guiding the sample cell to a desired position in the sample space.

The sample cell may comprise a cuvette.

The sample space may have a shape and/or size that matches a shape and/or size of a sample cell for insertion into the first chamber, for example such that in operation the sample cell when in the sample space is maintained substantially upright and/or is substantially prevented from moving in at least one, preferably each, direction, for instance by way of contact or proximity between walls of the first chamber and walls of the sample cell. The walls of the sample space may be arranged such as to restrict movement of the sample cell so as to maintain the sample cell in a desired position, for example substantially upright.

The sample space may be configured such that the removable sample cell substantially fills the sample space when inserted.

The sample cell may comprise wall(s) that are at least partially transparent to the light such that when inserted into the sample space of the first chamber, light from the input is able to enter and exit the sample cell through said at least partially transparent wall(s).

The sample cell may comprise walls that are substantially transparent over substantially the whole of their area. For example, each of the walls of the sample cell may be substantially transparent over substantially the whole of its area.

The sample cell may comprise at least one substantially opaque wall that includes at least one substantially transparent aperture.

The first chamber may be configured such the aperture or at least one of the apertures of the sample cell is aligned with the light input of the first chamber and/or such that the aperture or at least one of the apertures of the sample cell is aligned with the exit aperture of the first chamber.

The substantially opaque walls of the sample cell may be reflective and/or comprise reflective layer(s) such that light inside the sample cell is reflected off the walls of the sample cell.

The walls of the first chamber may be less reflective than the walls of the sample cell. In embodiments, the walls of the first chamber are substantially non-reflective. Such embodiments may be particularly useful in combination with a sample cell comprising reflective walls.

The sample cell may comprise a disposable sample cell. In embodiments, the sample cell may be made from polymers, such as organic polymers commonly referred to as 'plastics'. For example, the sample cell may be made from PVC, polyethylene, etc. Advantageously, such materials may enable cheap manufacture of sample cells thereby enabling the sample cells to be disposable.

The light input and the exit aperture may be arranged such that, in operation, at least some, optionally substantially all, of the light from the light input is reflected and/or scattered at least once before passing through the exit aperture.

The light input may be aligned with a point or region of a wall of the first chamber that is distal from the exit aperture.

Walls of the second chamber may be reflective such that in operation at least some, optionally substantially all, of the light entering via the optical path undergoes at least one reflection before detection by the detector. All of the walls of the second chamber may be reflective.

The reflectivity and arrangement of the walls of the second chamber may be such that substantially all of the light at a detection wavelength entering via the optical path is received by the detector.

Walls of the first chamber and/or the second chamber may comprise a reflective material, optionally titanium oxide, aluminium, or silver.

The reflective material may be provided on the walls of the first chamber and/or the walls of the second chamber using at least one of a deposition process, a coating process, a sputter deposition process, a painting process, a printing process.

The method used to form or provide the reflective material may be selected in order to provide at least one of a desired uniformity of coating, thickness, reflectivity, diffusive properties, ease of production, speed and expense.

The walls of the first chamber and/or second chamber may comprise a diffusive coating configured to produce diffuse light. The diffusive coating may comprise zinc oxide and/or aluminium oxide.

The walls of the second chamber may define a detection space and at least part of the detector for receiving light may be present within the detection space.

At least part of the detector may extend away from at least one of the walls into the detection space.

The detector may comprise a light receiving element. The light receiving element may comprise, or be configured to guide light to, a detection element of the detector.

The detection element may comprise an element configured to produce electrical signals in response to light.

The light receiving element may be mounted in the detection space of the second chamber remote from the walls of the second chamber.

The light receiving element may be arranged with respect to the walls of the second chamber such that it is receives the light from at least a first direction and a second opposing direction.

The arrangement of the optical path and the second chamber may define an optical axis from the input aperture to a point or region on a wall of the second chamber opposing the input aperture, and the light receiving element of the detector is located in an off-axis position with respect to said optical axis.

The second chamber may be formed and arranged so that at least some, optionally substantially all, of the light received by the detector is reflected at least once in the second chamber before being received.

The second chamber and detector may be formed and arranged to operate as an integrating light collector.

The detector may comprise any suitable type of detector, for example any suitable photoelectric, photovoltaic photochemical device. The detector may comprise a quantum dot device, optionally a graphene/Si quantum dot device and/or any suitable semiconductor device.

The detector may comprise at least one photodiode, and/or at least one camera and/or at least one photo-multiplier tube.

The optical path may comprise a passage between the first chamber and the second chamber. In embodiments, the apparatus comprises a passage between the first chamber and the second chamber, the passage forming the optical path.

The passage may comprise walls that are at least partially reflective.

In embodiments, the light input may be configured to receive light from a light source, such as a laser and/or an LED.

In embodiments, the light source is a collimated light source. In embodiments, the light source is a monochromatic collimated light source.

The light may have a wavelength that is such that the light scatters and/or is absorbed from or by the particles if present. In embodiments, the light has a wavelength that is such that the light scatters and/or is absorbed by microorganisms.

The light may have a wavelength in the range 600 nm to 800 nm, optionally in the range 590 nm to 650 nm or in the range 620 nm to 750 nm. The light may have a known modulation.

The first chamber may be larger than the second chamber. The first chamber and/or the second chamber may each have a respective cube or cuboid shape.

The first chamber and the second chamber may be arranged in a substantially L-shaped configuration.

The first chamber may have a volume in a range 1 µL to 10 mL and/or the second chamber may have a volume in a range 1 µL to 10 mL.

The exit aperture and/or the input aperture may have a cross-sectional area with a diameter in a range 1 to 10 mm. The diameter of an aperture may refer to the diameter of the smallest circle in which the aperture would fit. In embodiments, the exit aperture and/or the input aperture may have a cross-sectional area in a range 1 $mm^2$ to 100 $mm^2$.

The first chamber may comprise a body defining the sample space and/or the second chamber may comprise a body defining the or a detection space. The first chamber and/or the second chamber may be formed of plastic or metal.

The body of the first chamber and/or the body of the second chamber may be formed using at least one of a moulding process, an injection moulding process, a printing process.

The body of the first chamber and/or the body of the second chamber may be removable, from each other and/or from a mounting or housing.

The body of the first chamber and the body of the second chamber may be formed as a single body.

The particles may comprise organisms.

The particles may comprise micro-organisms, optionally bacteria, fungi or other particulate matter.

The sample may comprise at least one of blood, blood plasma, urine, water, bacterial growth fluid, cerebrospinal fluid (CSF), pus, or joint aspirate.

Also provided is a system comprising a detection apparatus according to any of the embodiments of the first aspect and a sample cell as described in relation to any of the embodiments of any other aspect.

In another aspect there is provided a system comprising at least one detection apparatus as claimed or described herein and further comprising detection circuitry for processing a detection signal from the detector, wherein the light is input with a known modulation and the detection circuitry comprises a detector configured to use the known modulation and the detection signal to generate a measurement signal. In embodiments, the detector is a phase sensitive detector. In embodiments, the detector comprises a lock-in amplifier. In embodiments, the system further comprises at least one sample cell as described herein.

In another aspect there is provided a system comprising a plurality of detection apparatus as claimed or described herein, provided in a single housing or mounting.

In a further aspect there is provided a system comprising a plurality of detection apparatus as claimed or described herein, further comprising a light guide arrangement for guiding light from a source to the light inputs of the plurality of detection apparatus.

The light guide arrangement may comprise a plurality of fibre optic cable arrangements, each fibre optic cable arrangement being configured to guide light from the source to a respective one of the light inputs.

Each fibre optic cable arrangement may comprise a fibre optic cable or a bundle of fibre optic cables.

The light guide arrangement may comprise at least one optical switch, splitter or router.

In another aspect, which may be provided independently, there is provided a system for analysing a plurality of liquid samples comprising one or more particles, for example by detecting the presence of particles in a plurality of liquid samples. The system comprises: a plurality of sample chambers, a detection chamber and a coupling mechanism operable to place a sample chamber of the plurality of sample chambers into a coupled configuration with the detection chamber. Each sample chamber comprises: a sample space for receiving a sample of the plurality of liquid samples; a light input for input of light into the sample chamber for interaction with the sample; and an exit aperture arranged for the light to pass from the sample chamber to the detection chamber when said sample chamber is in the coupled configuration with the detection chamber; and a detector for detecting, or a detector aperture for receiving, light to be detected; wherein said sample chamber and the detection chamber comprise at least one light integrating volume, and wherein the sample chamber is configured such that in operation the liquid sample is present in the sample chamber and isolated from the detection chamber.

In embodiments, in the coupled configuration, the apparatus comprises an optical path between said sample chamber and the detection chamber, the exit aperture of the sample chamber is arranged for light to pass from the sample chamber to the detection chamber via the optical path, and the detection chamber comprises an input aperture for receiving light from the optical path when the sample chamber is in the coupled configuration with the detection chamber.

The coupling mechanism may be operable to sequentially place each sample chamber into the coupling configuration with the detection chamber.

The coupling mechanism may be operable to rotate the sample chambers, optionally, wherein the coupling mechanism comprises a carousel mechanism.

The system may further comprise a driving arrangement arranged to drive the coupling mechanism, optionally, wherein the driving arrangement comprises mechanical or electro-mechanical components, for example mechanical or electro-mechanical actuators.

In another aspect, which may be provided independently, there is provided a method of analysing a liquid sample comprising particles, for example by detecting particles in the liquid sample. The method comprises inputting light into a sample chamber for interaction with a sample, wherein the sample chamber is or comprises or forms part of an integrating volume that directs substantially all light scattered by the sample to a separate detection chamber; and detecting light received in the detection chamber from the sample chamber to obtain a measurement representative of a property of the sample, such as the presence and/or quantity of particles in the liquid sample. In embodiments, analysing the sample comprises determining one or more of: the presence or absence of particles, the number of particles, the concentration of particles, and the size of particles. In other words, the method may comprise detecting light to obtain a measurement representative of a property of the sample selected from: the presence or absence of particles in the sample, the number of particles in the sample, the concentration of particles in the sample, and the size of particles in the sample.

The method may comprises repeating the inputting of light and obtaining of a measurement at a plurality of different times. The method may thereby determine a variation in the number or size of particles in the sample as a function of time and/or as a function of treatment of the sample.

The treatment may comprise treatment with a selected one or more materials, for example a selected one or more antibiotics.

In another aspect there is provided a method of performing measurements on a plurality of samples using a system as claimed or described herein comprising providing samples in each of the different sample chambers and performing measurements on the samples in the different sample chambers either simultaneously or at different times.

The method may comprise repeating the measurements on the samples at a plurality of different times thereby to determine a variation in the number or size of particles in the samples as a function of time and/or as a function of treatment of the samples.

In another aspect, which may be provided independently, there may be provided a cuvette or other removable sample container comprising reflective walls and at least one aperture, optionally two apertures, for entry and exit of light, wherein the cuvette or other removable sample container provides a light integrating volume. All of the walls of the cuvette or other sample container may be reflective. The apertures may comprise apertures on opposing sides of the cuvette or other container. The apertures may comprise a first aperture having a first axis along which light passes in operation and a second aperture having a second axis along which light passes in operation, and the first axis and the second axis may be non-aligned.

In another aspect, which may be provided independently, there is provided a sample container for use with one or more detectors and/or detection chambers, the sample container comprising:

a containing portion for containing a liquid sample;
a sample cassette comprising a plurality of sample chambers, and
a liquid distribution mechanism for distributing the contained liquid sample from the containing portion to the plurality of sample chambers. Each of the plurality of sample chambers may be configured to be placed into a coupled configuration with the one or more detectors and/or detection chambers.

At least one of the sample chambers of the plurality of sample chambers may provide a light integrating volume. At least one surface of said sample chamber may comprise a reflective material. At least one surface of said sample chamber may be at least partially transparent to light. At least one surface of the sample chamber may comprise an aperture for allowing passage of light. The light may comprise light of a selected wavelength or range of wavelengths for performing measurements with respect to the sample.

Each of the plurality of sample chambers may comprise at least one of:
- a light input for input of light into the sample chamber for interaction with the liquid sample in the sample chamber;
- an exit aperture arranged for the light to pass from the sample chamber via an optical path to one of the one or more detection chambers when in a coupled configuration with the detection chamber. The sample chamber and the detection chamber may comprise or form, individually or in combination, at least one light integrating volume. The sample chamber may be configured such that in operation the liquid sample is present in the sample chamber and isolated from the detection chamber.

In operation the liquid sample may be present in the sample chamber and isolated from the detection chamber.

The containing portion and the sample cassette may be separable. The sample cassette may be configured to engage with the containing portion. The sample cassette may be configured to disengage from the containing portion.

The distribution mechanism may be configured to distribute the contained liquid sample from the containing portion to the plurality of sample chambers when the containing portion and sample cassette are engaged. The distribution mechanism may be configured to prevent, and/or comprise means for preventing, the distribution of liquid sample to the plurality of sample chambers when the containing portion and sample cassette are separated and/or disengaged.

The sample container and each of the sample chambers may be moveable between a respective engaged and/or open state and a respective disengaged and/or closed state. It may be that in the engaged state the liquid sample is able to pass from the sample container to the sample chamber and in the disengaged or closed state the liquid sample is prevented from passing from the sample container to the sample chamber.

The sample container may further comprise an attachment mechanism for attaching the containing portion to the sample cassette.

The distribution mechanism may further comprise a valve mechanism configured to control a flow of liquid from the containing portion to the plurality of sample chambers.

The valve mechanism may be operable to move from an open configuration, in which liquid is permitted to pass from the containing portion to the sample cassette, and a closed configuration in which liquid is blocked from passing from the containing portion to the sample cassette.

The valve mechanism may be configured to be moved from an open configuration to a closed configuration on separation of the container portion from the sample cassette.

The valve mechanism may be configured to be moved from a closed configuration to an open configuration on attachment of the sample cassette to the container portion.

The valve mechanism may comprise at least one opening and/or at least moveable member, operable to cover the at least one opening thereby to place the valve mechanism in the closed configuration.

The distribution mechanism may further comprise one or more fluid channels coupled to the plurality of sample chambers.

The distribution mechanism may further comprise one or more dividing walls portioning the cassette into a plurality of sample partitions, each sample partition containing a sample chamber.

The valve mechanism may be configured to co-operate with the attachment mechanism.

The valve mechanism may be configured to be moved from an open configuration to a closed configuration on separation of the container portion from the sample cassette.

The valve mechanism may be configured to be moved form a closed configuration to an open configuration on attachment of the sample cassette to the container portion.

The attachment mechanism and/or valve mechanism may be operable through rotation of one or more of the sample cassette.

The sample container may further comprise a lid for the liquid container portion. The lid may comprise a recess for collecting sediment and/or other debris form the liquid sample in response to inversion of the container.

The container may comprise at least one adhesive and/or reactive surface or component configured to collect sediment and/or other debris from the liquid sample.

The sample cassette portion may provide a base or stand for the container portion.

The sample container may further comprise a support for supporting the container portion, for example, on separation from the sample cassette.

The distribution mechanism may be configured to distribute the liquid sample under the influence of, and/or in response to, at least one of:
- gravity, fluid pressure and/or an applied pressure.

The attachment mechanism, distribution mechanism and/or valve mechanism may comprise one or more of:
- a threaded screw and corresponding aperture, a bayonet attachment, a luer-lock type system, a plug and socket.

In another aspect, which may be provided independently, there is provided a system for detecting the presence of particles in a liquid sample comprising:
- a sample container comprising:
    - a containing portion for containing the liquid sample;
    - a sample cassette comprising a plurality of sample chambers, and
    - a liquid distribution mechanism for distributing the contained liquid sample from the containing portion to the plurality of sample chambers.

The system may further comprise a detection chamber and a coupling mechanism operable to place a sample chamber of the sample cassette into a coupled configuration with the detection chamber such that, in the coupled configuration, light can, for example, pass from the sample chamber to the detection chamber. In embodiments, the system comprises an optical path between said sample chamber and the detection chamber.

Each sample chamber may comprise: a sample space for receiving a part of the liquid sample, a light input for input of light into the sample chamber for interaction with the sample; and an exit aperture arranged for the light to pass from the sample chamber via the optical path to the detection chamber when said sample chamber is in the coupled configuration with the detection chamber.

The detection chamber may comprise at least one of: an input aperture for receiving light from the optical path when the sample chamber is in the coupled configuration with the detection chamber; and a detector for detecting, or a detector aperture for receiving, light to be detected. Said sample chamber and/or the detection chamber, considered alone or in combination, may comprise at least one light integrating volume. The sample chamber may be configured such that in operation the liquid sample is present in the sample chamber and isolated from the detection chamber.

The sample chamber may comprise transparent wall(s) and the transparent wall(s) may provide the optical path. Alternatively the sample chamber may comprise at least one opaque and/or reflective wall and the optical path may comprise at least one aperture in said at least one opaque and/or reflective wall. The aperture and/or optical path may be aligned or alignable with a detector or a detector input of the detection chamber. The sample chamber and the detector chamber may be formed and/or arranged such that when the sample chamber is located in an operating position in the detector chamber, the aperture and/or the optical path is aligned with a detector or a detector input of the detection chamber.

In another aspect, which may be provided independently, there is provided a method of analysing a liquid sample comprising particles, for example by detecting particles in the liquid sample, comprising:

- providing a system for detecting the presence of particles in accordance with any aspect, claim or embodiment provided herein, for example the immediately preceding aspect;
- obtaining a liquid sample in the containing portion of the sample container;
- distributing the liquid sample to the plurality of sample chambers of the sample cassette so that each of the plurality of sample chambers contains a portion of the liquid sample;
- placing a sample chamber in the coupling configuration with the detection chamber;
- inputting light into the sample chamber for interaction with the portion of the liquid sample contained therein, wherein the sample chamber is or comprises or forms part of an integrating volume that directs substantially all light scattered by the sample to the detection chamber; and detecting light received in the detection chamber from the sample chamber to obtain a measurement representative of the presence and/or quantity of particles in the portion of liquid sample in said sample chamber.

The method may further comprise operating the coupling mechanism to place at least one further sample chamber containing a further portion of liquid sample into a coupling configuration with the detection chamber and inputting light into the at least one further sample chamber to obtain a measurement representative of the presence and/or quantity of particles in the further portion of liquid sample.

The method may further comprises introducing one or more materials, for example, antibiotics, into each of the plurality of sample chambers.

In another aspect, which may be provided independently, there is provided a sample cell comprising a sample space for receiving a liquid sample and further comprising at least one substantially opaque wall that includes at least one substantially transparent aperture.

The walls of the sample cell may be reflective.

The sample cell may comprise a cuvette.

Features in one aspect may be applied as features in any other aspect in any appropriate combination. For example, any one or more of method, apparatus or system features may be applied as any other of method, apparatus or system features.

BRIEF DESCRIPTION OF THE DRAWINGS

Embodiments will now be described by way of example only, and with reference to the accompanying drawings, of which:

FIGS. 15(a) to 15(k) are perspective views of the sample container including upper sampler container portion, base portion and valve mechanism.

DETAILED DESCRIPTION OF THE DRAWINGS

Figure 1:
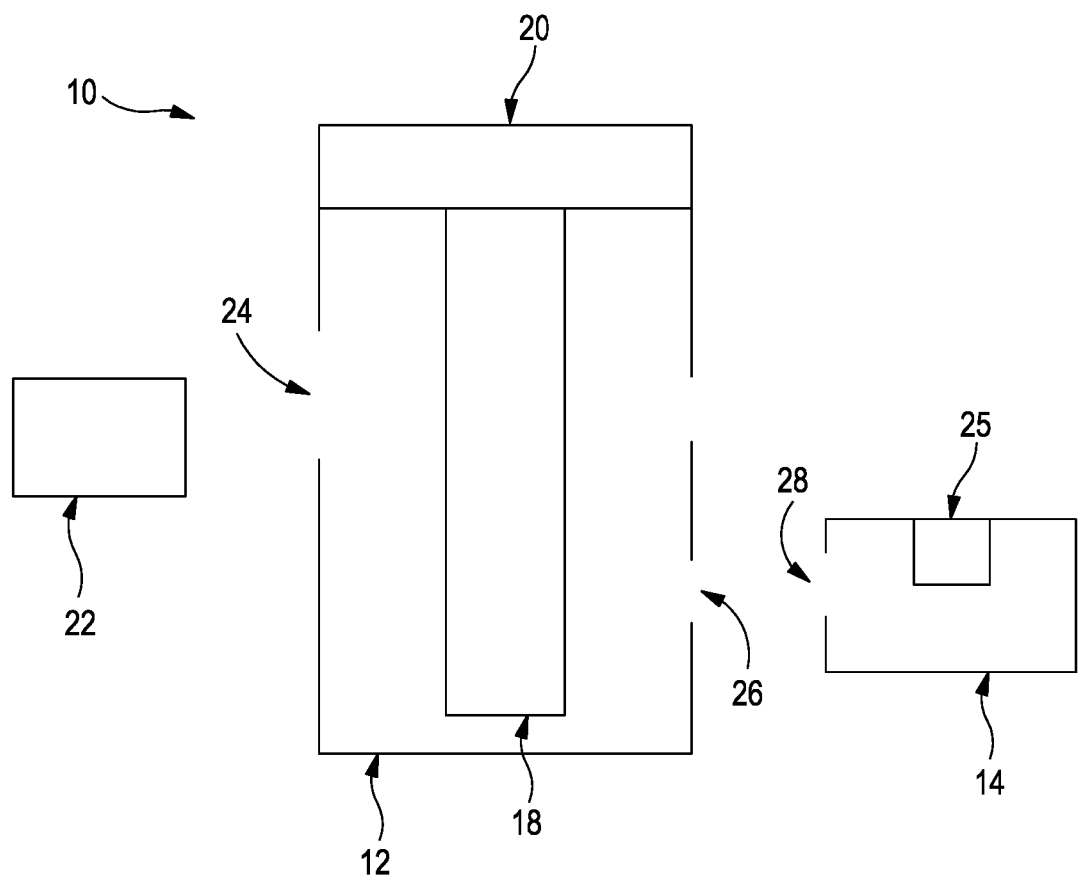
FIG. 1 is a schematic diagram of a detection apparatus.

FIG. 1 is a schematic diagram of a detection apparatus 10 for detecting the presence of organisms in a liquid sample in accordance with embodiments. The detection apparatus 10 has two chambers: a first chamber, also referred to as sample chamber 12 and a second chamber, also referred to as a detection chamber 14. As described in further detail below, an optical path is provided between the sample chamber 12 and the detection chamber 14.

The sample chamber 12 and detection chamber 14 are hollow and act to integrate light. The sample chamber 12 is a light integrating chamber that acts as a light diffusion and light collection chamber. The detection chamber 14 is also a light integrating chamber that acts as a light diffusion and light collection chamber. In this embodiment, each of the chambers provide a respective light integrating volume coupled together by the optical path.

As described in further detail below, each chamber acts a light diffusion and light collection chamber. Light is introduced to the sample chamber, scattered by the sample and reflected multiple times off the internal walls to produce a substantially uniform distribution of light throughout the interior of the chamber. Collected light exits the sample chamber 12 via the optical path and is introduced to the detection chamber 14, where it is reflected multiple times off the internal walls to produce a substantially uniform distribution of light throughout the interior of the chamber, before being detected. In operation, the sample is located inside the sample chamber 12. Because the sample is located inside sample chamber 12, light may pass through it multiple times.

In the present embodiment, sample chamber 12 provides a first integrating volume and detection chamber 14 provides a second integrating volume. Whilst the sample chamber 12 and the detection chamber 14 each individually functions as an integration chamber 14, the combination of the sample chamber 12, the detection chamber 14 and the optical path joining them (which may be in the form of a passage with reflective walls as discussed below) in the present embodiment can be considered to function as a single larger integrating chamber.

In further embodiments, only one of the sample chamber 12 and detection chamber 14 provides an integrating volume. In some embodiments, the sample chamber 12 and detection chamber 14 together provide an integrating volume for diffusing and collecting light.

The sample chamber 12 has a space, also referred to as a sample space configured to receive a sample to be tested. In this embodiment, the sample is contained inside a removable sample cell 18. The sample chamber 12 can be in an open configuration or in a closed configuration. Sample chamber 12 has a closeable opening such that the configuration of sample chamber 12 can be changed from its open configuration to its closed configuration and vice versa.

In the open configuration, the sample chamber 12 is configured to receive the sample, in this embodiment, the sample cell 12. In the closed configuration, the sample chamber 12 is configured for detection. In this embodiment, the closeable opening is at the upper end of the sample chamber and is closeable by a lid 20. In this embodiment, lid 20 is removeable.

In the closed configuration, the sample space of the sample chamber 12 is defined by the internal walls of the sample chamber 12 and the lid 20. The sample space has dimensions, for example, a shape and/or a size that match the shape and/or size of the removable sample cell 18 to allow for insertion of the removable sample cell 18 into the sample chamber 12, and thus to allow for positioning of the sample inside the sample chamber 12.

The removable sample cell 18 contains the sample to be tested. The removable sample cell 18 provides isolation of a liquid sample provided in the sample chamber 12 from the detection chamber 14. In some embodiments, the sample cell 18 is or includes a cuvette. When inserted into the sample space, the removable sample cell 18 substantially fills the volume of the sample space.

The removable sample cell 18 is configured to allow light to enter and exit such that light provided to the sample cell 18 can interact with the biological sample contained within. In this embodiment, the removable sample cell 18 has transparent walls that allow the light to pass through and thereby enter and/or exit the sample cell 18. In some embodiments, the walls are partially transparent A light source 22 is provided. The sample chamber 12 has a light input 24 configured to receive light from the light source 22. The sample chamber 12 also has an exit aperture 26. A beam axis can be defined between the light source 22 and the light input 24, such that, in operation, light from the light source 22 travels substantially along the beam axis and enters the sample chamber 12 via the light input 24. The exit aperture 26 for scattered light is positioned in an off-axis position with respect to the beam axis such that the exit aperture 26 and the light input 24 are not aligned. In some embodiments, the light input 24 is aligned with a point or region of a wall of the sample chamber 12 that is distal from the exit aperture 26 in a direction perpendicular to the beam axis.

In some embodiments the point or region of the wall with which the beam axis is aligned comprises an aperture that leads to a beam dump. In such embodiments the laser beam or other collimated modulated light from the light source passes through the sample and directly to the beam dump. In such embodiments it is only the light that is scattered by the sample that is collected by the integrating collector provided by the sample chamber. The light that is not scattered passes directly to the beam dump.

The light source is selected to produce light with a wavelength or range of wavelength that is such that the light scatters and/or is absorbed from the organisms if present. In some embodiments, the light source may produce light that has a wavelength in the range 600 nm to 800 nm, optionally in the range 590 nm to 650 nm or in the range 620 nm to 750 nm. The light of selected wavelength or range of wavelengths that is detected by the detector and used in the determination of the presence and/or amount of particles such as biological particles may be referred to as the operating wavelength.

The detection chamber 14 has internal walls that define an inner space, also referred to as a detection space. The apparatus 10 also has a detector 25 associated with the detection chamber 14.

The detector 25 has a light receiving element or region (not shown) for receiving light. The detector 25 also has a detection element which may be provided as part of the light receiving element or as a separate component. The light receiving element of the detector is configured to receive light and guide said light to the detection element. The detection element produces electrical detection signals in response to receiving light.

In this embodiment, the detector 25 extends away from an inner wall of the detection chamber apparatus such that the light receiving region of the detector 25 is present inside the detection space. The light detection element is not shown. The light receiving element of the detector 25 is mounted in the detection space of the detection chamber 14, remotely from the walls of the detection chamber 14. To describe placement of the detector 25, an optical axis can be defined between the input aperture 28 to a point or a region of the detection chamber 14 that opposes the input aperture 28. The point or region may comprise or be considered as a baffle region. An additional baffle element may be provided at that point or region in some embodiments The light receiving element of the detector 25 is located at an off-axis positioned with respect to this axis.

In some embodiments, the light receiving element is provided substantially inside the detection chamber and the light detection element is provided substantially outside the detection chamber.

Sample chamber 12 has an exit aperture 26 provided in a wall of the sample chamber 12 for scattered light to exit the sample chamber. Detection chamber 14 has an input aperture 28 provided in a wall. The optical path passes through exit aperture 26 of the sample chamber 12 and the input aperture 28 of the detection chamber 14.

As discussed above, the inner walls of the sample chamber 12 and lid define the sample space. In this embodiment, the walls and lid are reflective. The reflective walls and lid 20 are arranged such that at least some of the light entering the sample chamber 12 is reflected a plurality of times before exiting the sample chamber 12 via the exit aperture 26.

In this embodiment, the inner walls of the detection chamber 14 are also reflective and arranged such that light entering the detection chamber 14 is reflected before being received by the detector 25.

In the present embodiment, the optical path is a passage between the sample chamber 12 and the detection chamber 14. The passage coupled exit aperture 26 of the sample chamber 12 and input aperture 28 of the detection chamber 14. The passage may be extended in a first dimension. The passage may have walls, for example, at least partially reflective walls.

In use, a biological liquid sample to be tested is prepared and contained within the removable sample cell 18. The lid 20 of the sample chamber 12 is opened to place the sample chamber 12 into its open configuration. The removable sample cell 18 is then inserted into the sample chamber 12 and the lid 20 closed to place the sample chamber 12 into its closed configuration.

In the closed configuration, the light source 22 emits light towards the light input 24. Light is received by light input 24 and introduced into the sample space. At least some of the introduced light passes through the transparent walls of the removable sample cell 18 and at least some of the light passing through the transparent walls of the removable sample cell 18 interacts with the sample in a first scattering event. The first scattering event produces first scattered light, at least some of the first scattered light propagates in a substantially different direction. At least some of the first scattered light exits the sample cell 18 through the transparent walls of the sample cell 18 towards one or more of the reflective walls and/or lid where it is reflected. At least some of the reflected light is then directed back towards the sample cell 18 to interact with the sample in a second scattering event.

In addition to being scattered, light may also be absorbed by the sample.

Thus the light introduced into the sample chamber 12 is reflected multiple times by the internal reflective surfaces of the sample cell 12 and therefore passes through sample cell 12 multiple times. The light therefore interacts with the sample through multiple scattering events before exiting the sample chamber 12 via the exit aperture 26. The light input 22 and the exit aperture 26 are arranged so that at least some or substantially all of the light entering the light input 22 is reflected or scattered at least once before passing through the exit aperture 26.

In some embodiments, the reflectivity and arrangement of the walls of the second chamber are such that substantially all of the light at a detection wavelength entering via the optical path is received by the detector.

Light exiting sample chamber 12 passes to the detection chamber 14 via the optical path. In particular, the light passes through exit aperture 26 and through input aperture 28.

Substantially all of the light entering the detection chamber 14 is reflected at least once by the internal walls of the detection chamber 14 before being received by the photodetector 25. Due to the position of the light receiving element of the detector 25, the light receiving element receives light from more than one direction. In particular, the light receiving element receives light from at least a first direction and a second opposing direction.

The sample chamber 12, detection chamber 14 and detector 25 are arranged to operate as an integrating light collector such that the sample chamber 12 and detection chamber 14 integrates or adds up the reflected light inside the sample and detection chambers. The sum of the reflected light is sampled by the photodetector 25. With a sample present inside the sample chamber 12, the distribution of the light detected by the photodetector 25 will change dependent on the optical properties of the sample.

It is a feature of embodiments, such as the embodiment of FIGS. 1 to 4, that a single sample and detection chamber in the form of an integrating sphere may be replaced by two or more distinct chambers that, individually or together, provide an integrating space. It has been found that any suitable shape of the chambers may be selected whilst still providing suitable measurement accuracy. The use of cuboid chambers, for example as in the embodiment of FIGS. 1 to 4, has been found to provide a particularly compact design, for instance enabling arrangement of multiple apparatus in a single housing in a compact side-by-side or other manner. This can be particularly useful in a point-of-care design where compact and robust design may be particularly important. Such a compact design can also make it more straightforward to multiplex light from a single source to multiple detection chambers as discussed further below. The multiple chamber design, for example as in the embodiment of FIGS. 1 to 4, may also enable relative movement of the detection chamber and sample chambers. This can be useful for example, if it is desired to use a single detection chamber and/or detector in combination with multiple sample chambers. Light from different sample chambers can be provided to the detection chamber in turn, for example by moving different sample chambers in alignment with the detection chamber in turn or by use of optical switching and/or routing components to direct light from different sample chambers to the detection chamber in turn.

The use of the same light source for different sample chambers, and/or the use of the same detector and/or detection chamber for different sample chambers, for example as may be enabled by a compact multi-chamber design such as that of FIGS. 1 to 4, can be beneficial as for example it can reduce variation in measurements that may otherwise result from the use of different light sources and/or different detectors or detector arrangements for different samples. This can be particularly important for point of care type systems where robust and reliable operation over a long period of time without significant operator maintenance or calibration may be particularly important.

The light source 22 can be any suitable light source. In some embodiments, the light source 22 is a laser or an LED. In some embodiments, the light source is provided separately from the apparatus and in other embodiments, the light source is provided as an integrated part of the apparatus. In some embodiments, light source is provided adjacent to the light input. In some embodiments, the suitable light source is any collimated light source, optionally a monochromatic collimated light source.

In alternative embodiments, light source is provided remotely from the light input 22 and an optical fibre or other suitable light guide is provided between light source and light input to allow light to travel from the light source to the light input.

In some embodiments, the photodetector 25 comprises a photodiode. It will be understood that any suitable photodetector or detector or device for detecting light may be used. Other suitable photodetectors include but are not limited to a digital camera, a photo-multiplier tube.

Additional detection circuitry (not shown) is also provided. The detection circuitry processes a detection signal from the detector. In some embodiments, the detection circuitry is a phase-sensitive detector. In such embodiments, light entering the light input may be modulated using a known modulation scheme and the detection circuitry is configured to use the known modulation and detection signal to generate a measurement signal.

As described above, at least part of the detector 25 for receiving light is present within the detection space. In other embodiments, the part of the detector 25 for receiving light is provided wholly outside the detection chamber 14 and/or the detector 25 itself is provided separately from and/or wholly outside the detection chamber 14. In such embodiments, a detection aperture (not shown) is provided in a wall of the detection chamber, and the detector and detection aperture are arranged to allow light to exit the detection chamber 14 towards the detector. Other optical elements may be provided either at the detection aperture, at the detector or on an optical path between the detection aperture and the detector, to guide and/or focus light exiting the detection chamber toward the detector 25.

Optical elements, for example lenses, that are moveable or non-moveable may be used. Non-moveable optical elements, for example, fixed-focus lenses, may provide the advantage of improved robustness in the event of dropping or other contact.

As mentioned above, in some embodiments, the sample chamber 12 has a beam dump output (not shown in FIG. 1). The beam dump output is positioned along the beam axis that is defined between the light source 22 and the light input 24. In operation, at least some light that enters the light input 24 is substantially not scattered or reflected by the sample and thus substantially passes through the sample and therefore exits the sample chamber 12 through the beam dump output to a beam dump (not shown). The beam dump is positioned to be on the beam axis. A baffle may also be provided in place of the beam dump.

As described above, the sample chamber 12 is configured such that in operation the liquid biological sample present in the first chamber and isolated from the second chamber. In the above described embodiments, isolation is provided by the sample cell 12. In other embodiments, isolation of the liquid biological sample present in the sample chamber 12 is provided by other or additional isolation means.

In some embodiments, a barrier is provided to prevent passage of the biological sample. It will be understood that the barrier may be provided at any position that prevents passage of the biological sample and provides isolation of the liquid biological sample from the second chamber. In some embodiments, the barrier is provided substantially inside the sample chamber 12. In some embodiments, the barrier is provided between the sample chamber 12 and the detection chamber 14.

In the above described embodiments, the removable sample cell 18 has transparent walls. In some embodiments, these walls are substantially transparent. In some embodiments, the sample cell comprises at least one wall that is substantially transparent, for example, over substantially all of its area.

In other embodiments, the sample cell has one or more substantially opaque walls that includes one or more substantially transparent apertures are provided in the opaque walls of the sample cell 18 to allow light to enter and/or exit the sample cell 18. In some embodiments, an entrance aperture is provide in a first substantially opaque wall (for example, the wall closest to the light input 24) and an exit aperture is provided in a second substantially opaque wall (for example, the wall closest to the exit aperture 26 of the sample chamber 12) to allow light to enter and exit the sample cell 18, respectively. In some embodiments, the entrance aperture of the sample cell 18 is aligned with the light input 24 and the exit aperture of the sample cell is aligned with the exit aperture 26 of the sample chamber 12.

In embodiments with substantially opaque walls, said walls may also be reflective or comprise reflective layers, such that light inside the sample cell is reflected off the walls of the sample cell. In further embodiments, the substantially opaque walls of the sample cell 18 are reflective and the inner walls of the sample chamber 12 are also reflective. It will be understood that by selecting different materials for the sample cell walls and the sample chamber walls, the walls of the sample chamber can be less reflective than the walls of the sample cell or vice versa. In some embodiments, the internal walls of the sample chamber 12 are substantially non-reflective and the walls of the sample cell 18 are reflective, such that multiple reflection of light in the sample chamber 12 occur in the sample cell 12 only. Thus, the sample cell itself may provide the integrating volume within the sample chamber in such embodiments.

Above walls and surfaces are described as transparent and opaque. It will be understood that these terms can mean substantially transparent and substantially opaque to a selected wavelength or range of wavelengths.

As a non-limiting example, suitable materials for the walls of the sample chamber 12 and detection chamber 14 include: any material that comprise a reflective material, titanium oxide, aluminium, silver, platinum. In some embodiments, a reflective material is provided on the walls of the sample chamber 12 and/or the walls of the detection chamber 14. The reflective material may be applied using any suitable application process, for example, a deposition process, a coating process, a sputter deposition process, a painting process, a printing process.

Reflective layers comprising aluminium, silver and/or platinum are all reflective layers that act to keep light inside and complete light integration of the chamber.

The walls may also comprise diffusive coating layers, for example, Zinc and Aluminium oxides. These coatings stop reflections forming beams and render the light into a homogeneous film of photons. Light reflected off a diffusive surface floods the interior of the chamber. This ensures that the photodetector is picking up a generalised signal not a particular beam reflecting from a particular point in the chamber (for example a corner).

In some embodiments, the walls of the integrating chamber are substantially reflective, that is to say "light-tight, such that no light can escape except along the beam path or into the detection chamber. It will be understood that substantially all of the light entering the sample chamber, that is not absorbed by the sample, or has exited the sample chamber, will be reflected.

In some embodiments, nearly all the light leaves the sample chamber through the beam dump output, as the laser beam passes through. The amount of light that is scattered by the sample is the light we are concerned with the reflected/refracted/scattered (RRS) light. In some embodiments, greater than 90% of the light entering the sample chamber exits through the beam dump output and less than 10% is scattered, reflected or refracted.

Some of the RRS light will leave the chamber via the laser entry and exit ports but the a large proportion of the light, in some embodiments greater than 95%, is collected by the sample chamber surrounding the sample.

Figure 2:
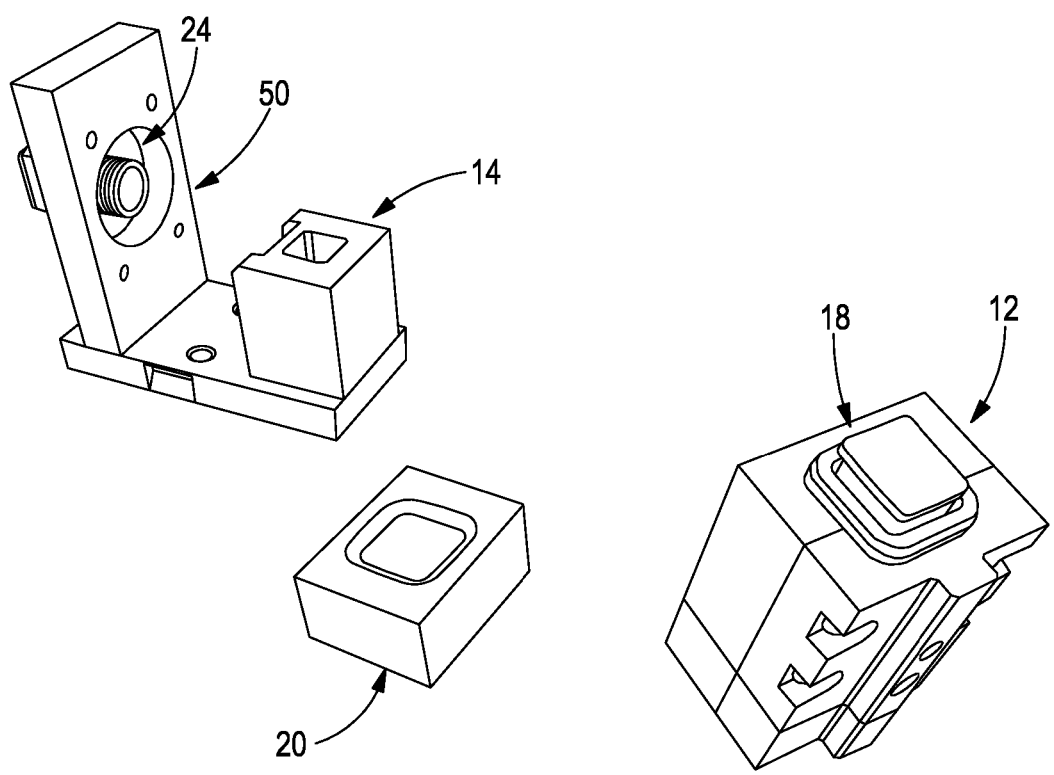
FIG. 2 is an exploded view of the detection apparatus in a disassembled configuration.
Figure 3:
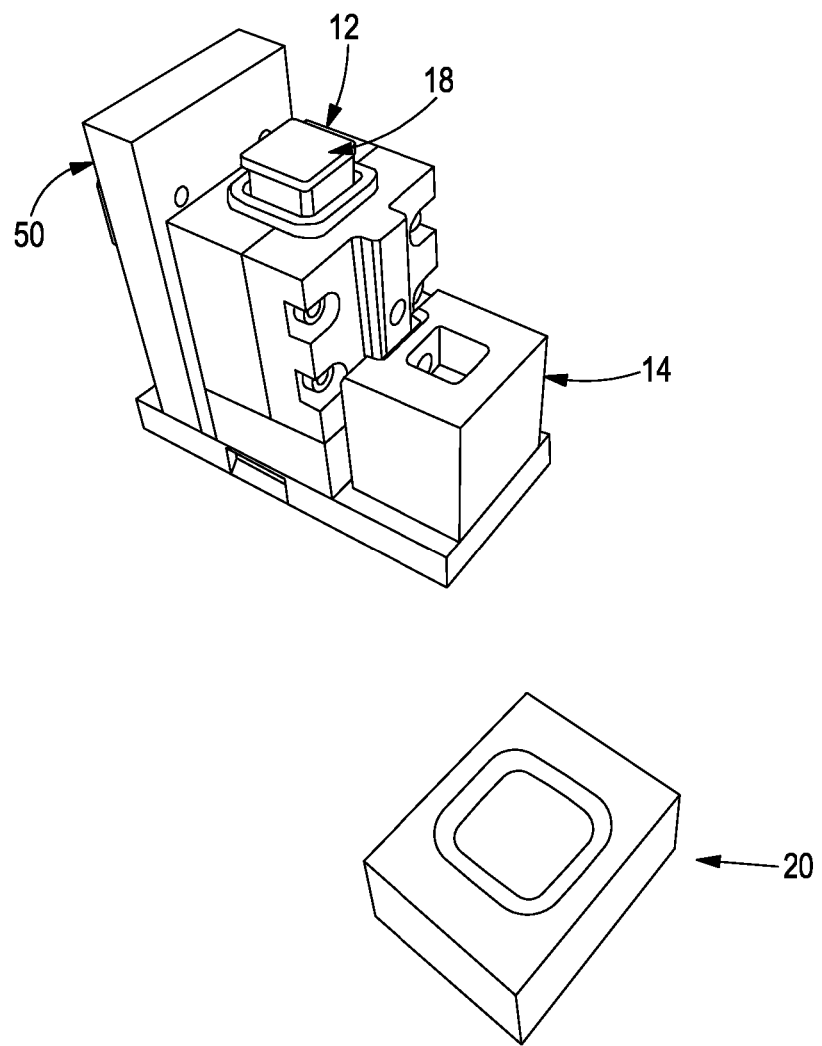
FIG. 3 is a view of the detection apparatus in an assembled and open configuration.
Figure 4:
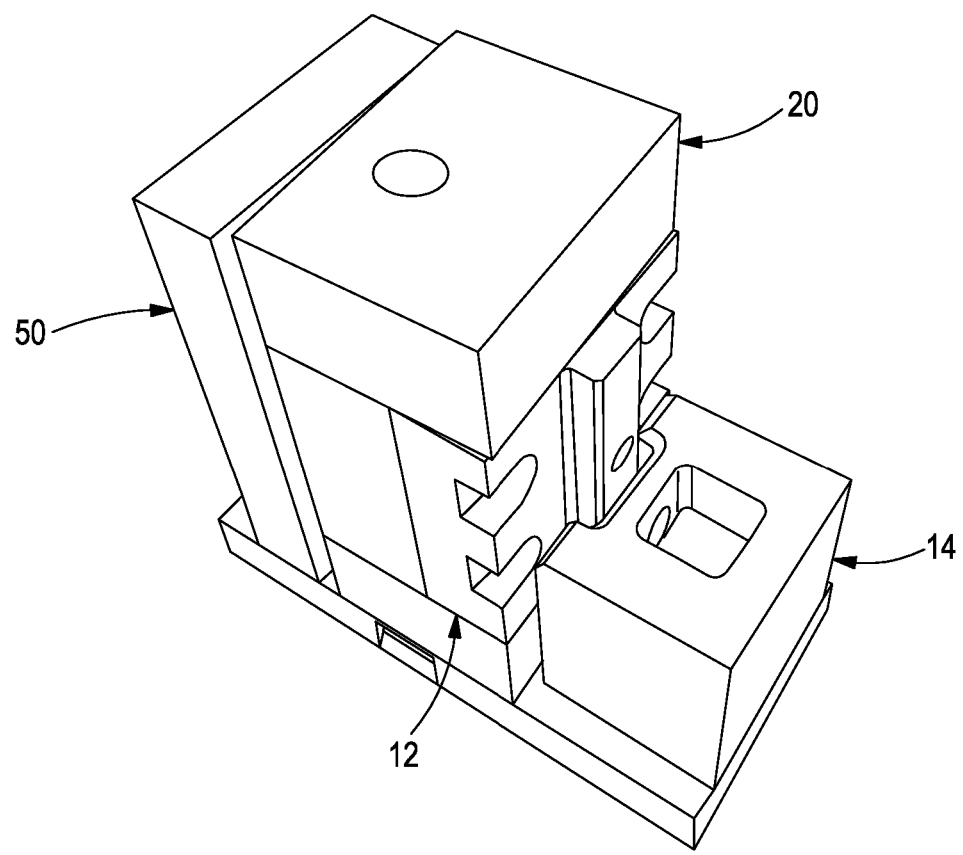
FIG. 4 is a view of the detection apparatus in an assembled and closed configuration.

In the embodiments described above, and as shown in further detail with reference to FIGS. 2, 3 and 4, the sample space has a shape and/or size that matches a shape and/or size of the removable sample cell 18 for insertion into the sample chamber 12. In the embodiments described above, the removable sample cell 18, once inserted, is maintained in a substantially upright direction. The matching of the shape and/or size of the removable sample cell 18 and the sample space of the sample chamber 12 allows the sample cell 18 to be prevented from moving in at least one direction, and preferable in any direction.

FIGS. 2, 3 and 4 show an embodiment of the detection apparatus. FIG. 2 shows an exploded view of the detection apparatus in a disassembled configuration. FIG. 3 shows the detection apparatus in an assembled and open configuration. FIG. 4 shows the detection apparatus in an assembled and closed configuration. In this embodiment, lid 20 is removable and therefore the apparatus is moved from the open configuration to the closed configuration by removing the lid 20.

FIG. 2 shows the apparatus 10 in a disassembled configuration. FIG. 2 shows the lid 20, the sample chamber 12 and the removable sample cell 18, substantially as described with reference to FIG. 1. The apparatus 10 also has a main body 50 that includes light input 24, detection chamber 14 and detector as described with reference to FIG. 1.

Together with the above described features, main body 50 also provides a mounting for sample chamber 12. In this embodiment, in addition to sample cell 18 being removable from sample chamber 12, the sample chamber 12 is removable from the main body 50 that includes the detection chamber.

FIG. 2 shows removable sample cell 18 inserted into sample chamber 12. The sample chamber 12 has a sample cell receiving arrangement for receiving the sample cell. The sample cell receiving arrangement has a guide (not shown) for guiding the sample cell 18 into the sample chamber 12. The guide allows the sample cell to be guided to the desired position inside the sample space, for detection.

In the embodiments described above have the sample space that has a shape and/or size that matches a shape and/or size of the sample cell 18 for insertion into the sample chamber 18 such that in operation the sample cell 18 when in the sample space is maintained substantially upright and/or is substantially prevented from moving. The sample space is prevented from moving in any direction by way of contact or proximity between walls of the sample chamber 12 and the walls of the sample cell 18. The walls of the sample space also restrict movement of the sample cell so as to maintain the sample cell in an upright position. In other embodiments, a different desired position can be maintained.

As can be seen from FIG. 2, sample chamber 12 is larger than the detection chamber 14. Sample chamber 12 and sample chamber 14 each have a respective cube or cuboid shape.

FIG. 3 shows apparatus 10 in an assembled and closed configuration. Lid 20 is removable, and FIG. 3 shows the lid 20 removed. It will be understood that in other embodiments, the lid 20 may be secured to the sample chamber 12 and openable to allow insertion of sample cell 18 into sample chamber 12. It will be understood that in other embodiments, any wall of the sample chamber 12, for example, base or side wall, may be removable or openable to allow insertion of sample cell 18 into sample chamber 12. Said removable or openable lid, wall or base can comprise a reflective surface for reflecting light in operation.

FIG. 4 show apparatus 10 in an assembled and closed configuration. It is seen that the sample chamber 12 and the detection chamber 14 are arranged in a substantially L-shaped configuration.

As described above, the body of the first chamber and the body of the second chamber are removable from each other. In other embodiments, the body of the first chamber and the body of the second chamber are removable from a third body that provides a mounting or housing. In other embodiments, the body of the first chamber and the body of the second chamber form part of a single body.

The body of sample chamber 12 and the body of the sample chamber 14 are formed of metal. In other embodiments, one or both of the bodies is formed of another material, for example, plastic. The bodies can be formed using at least one of a moulding process, an injection moulding process, a printing process.

As described above sample cell 18 can be or can comprise a cuvette. In some embodiments, sample cell 18 is disposable.

In some embodiments, the body of the sample chamber 12 and any further body to which the sample chamber is coupled to has one or more location pins or other securing means to secure the sample chamber in place. The location pins allow for alignment between apertures of the sample chamber and detection chamber and/or the light source.

A L-shaped configuration allows for the possibility of two independent but cooperating integrating spaces. This may allow independent movement of said integrating spaces and/or moving integrating spaces with one (or more) detector and one (or more) sample chambers The use of a sample cuvette that fits tightly within the sample chamber may reduce the space between the sample itself and the reflective and diffusive walls of the sample chamber. This may reduce the chance of a scattered photon being erroneously deflected out of one of the light input or the exit ports (and therefore lost), and/or the chance of a scattered photon being absorbed by atmospheric air particles present in space between the sample cuvette and the reflective walls and thereby lost by absorption. Such arrangements may be easily obtained using a cuboidal shaped sample chamber and correspondingly shaped sample cuvette.

A cuboidal shape of the sample chamber may provide additional advantages. As the sample chamber "jackets" or "clothes" the cuvette (rather than the sample chamber being e.g. a sphere), less space is provided between the sample itself (the liquid within the cuvette) and the reflective and diffusive walls of the sample chamber. Because there is less space there is a smaller chance of a scattered photon being erroneously deflected out of one of the laser entry or the exit ports (and therefore lost). In addition or alternatively, there is a smaller chance of a scattered photon being absorbed by atmospheric air particles present in the space and loss by absorption.

The cuboidal shape may provide further advantages. In particular, the cuboidal shape may allow a plurality of sample chambers to arranged in a closely packed configuration, for example, by stacking or side-by-side. This may provide the following advantages: efficient use of space; ease of movement in embodiments with a single laser and/or detector array is used, and the sample chambers are moved in to a coupled configuration with the single laser and/or detector array; easier heating and cooling of the entire system (all "stacked" cuboidal spaces) is much easier than many large integrating spheres side-by-side. The efficient use of space may be an issue in a laboratory with limited bench space and/or for transporting the sample chambers.

The packing may also allow for a reduction in variations in operating conditions. For example, a control sample and experimental sample may be placed closed together such that each experiences substantially the same environment.

Figure 5A:
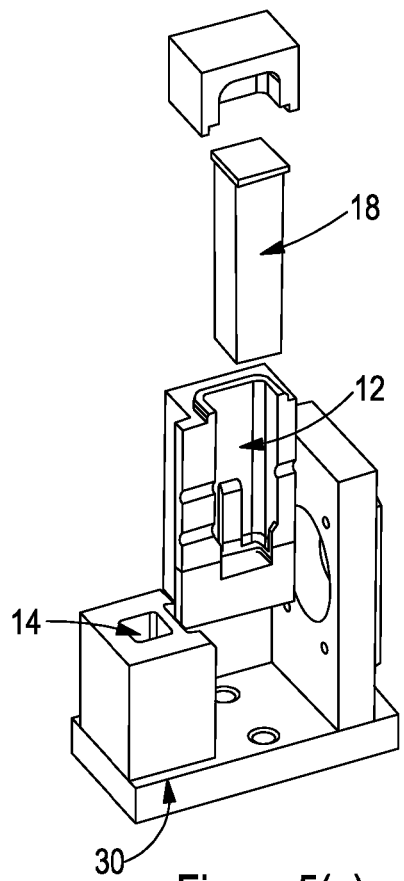
FIGS. 5a to 5g are schematic diagrams in perspective and cut-away views of detection apparatus according to embodiments.
Figure 5B:
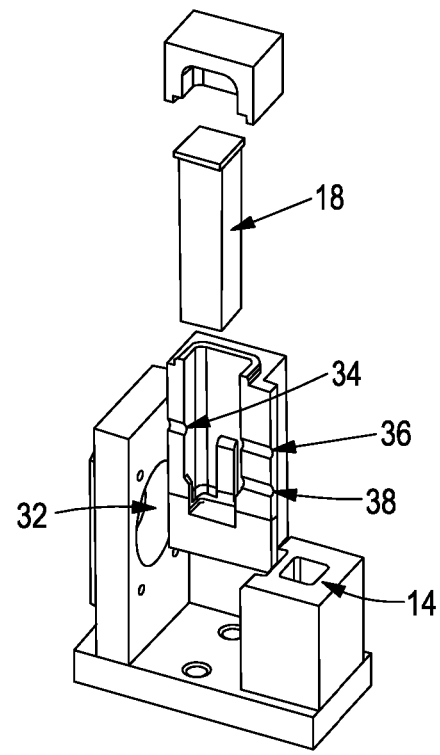
Figure 5C:
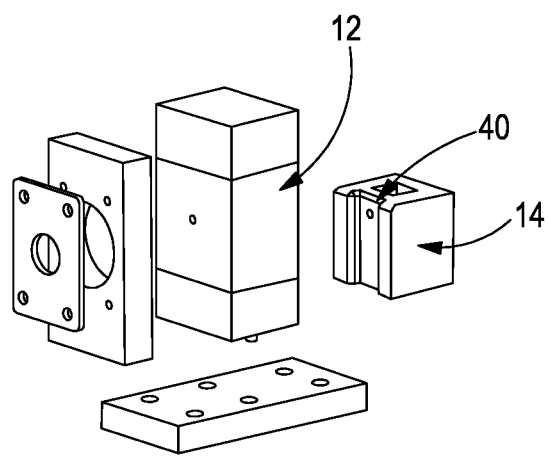

FIGS. 5*a* to 5*c* show a detection apparatus according to a further embodiment, in perspective cut-away and exploded views. The structure of the apparatus of the embodiment of FIGS. 5*a* to 5*c* is similar to the embodiments of FIGS. 1 to 4, and includes a sample chamber 12, detection chamber 14 and sample cell in the form of insertable, disposable cuvette 18. The diagrams of FIGS. 5a and 5b show the sample chamber 12 in cut-away view and with the sample chamber 12, cuvette 18 and sample chamber lid 20 in a partially exploded configuration. The apparatus of FIGS. 5a to 5c includes a mounting arrangement 30 to which the sample chamber 12 and detection chamber 14 are mounted to form the apparatus. The sample chamber 12 and detection chamber 14 are separately attachable and detachable to and from the mounting 30, which can make maintenance, cleaning and/or repair or replacement of components straightforward.

The mounting 30 includes a mounting plate that includes an aperture 32 to which a laser or other light source can be mounted. When the laser or other light source is installed at aperture 32 an output of the laser or other light source is aligned with input port 34 of sample chamber 12, which in turn is aligned with output port 36 of the sample chamber. When the apparatus is in its operating configuration, light from the laser passes through the input port 34 into the sample that is in the sample chamber (either in cuvette 18 or contained in sample chamber directly). Any light that is unscattered or that is forward scattered along a beam axis of the laser and passes through exit port 36 and usually onward to a beam dump (not shown). The L-shaped configuration of sample chamber 12 and detection chamber provides for a compact configuration in which, for example, the beam dump may be positioned at least partially above the detection chamber 14.

Light that is scattered by the sample is reflected within the sample chamber (for example, either by reflective walls of the sample chamber and/or by reflective walls of the cuvette depending on the particular embodiment) and eventually exits the sample chamber via the further port 38 and them enters the detection chamber via an input port 40 of the detection chamber. The further port 38 and the input port 40 are aligned when the apparatus is in its operating configuration.

Figure 5D:
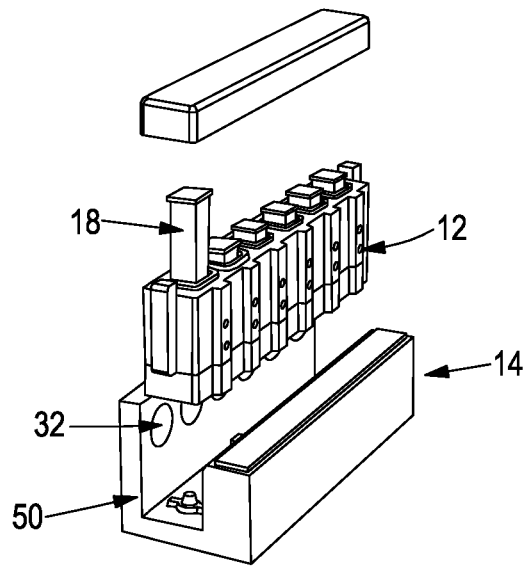
Figure 5E:
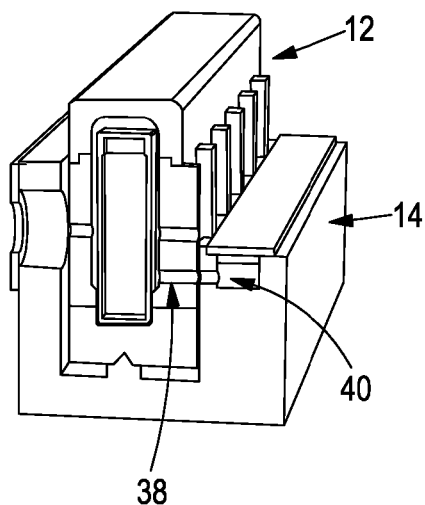

FIGS. 5d and 5e are perspective views of an apparatus according to a further embodiment. The components and configuration of the embodiment of FIGS. 5d and 5e are similar to those of the embodiments of FIGS. 5a to 5c, but in this case a row of six detection chambers 14 is mounted in mounting 50. Each detection chamber can be used to hold a separate cuvette or other sample cell 18. Each sample cell may, for example contain a different sample, for example different microbes or the same microbes in combination with different antibiotics or other potentially active agents.

In the embodiment of FIGS. 5d and 5e, each sample chamber 12 has a respective associated aperture 32 in the mounting for mounting a laser or other light source. Alternatively, a single light source may be used with separate light guides, for example, fibre optic cable(s) leading from the light source to the apertures 32. The apparatus may include control elements and/or controllable optics such that each sample chamber 12 may be subject to light input from the source either simultaneously or sequentially or individually on command, as desired.

The embodiment of FIGS. 5d and 5e includes a single common detection chamber 14 including a single detector apparatus. The light inputs to the sample chambers may be operated in turn and separate measurements corresponding to the different sample chambers may be obtained in turn using the common detection chamber 14 of FIGS. 5d and 5e.

Figure 5F:
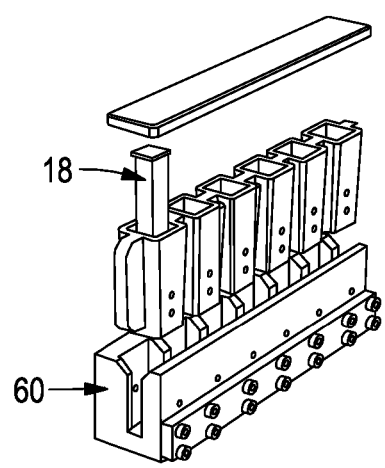
Figure 5G:
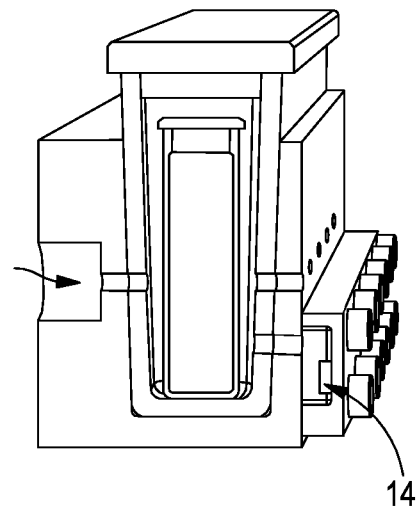

FIGS. 5f and 5g are perspective views of an apparatus according to a further embodiment. The components and configuration of the embodiment of FIGS. 5f and 5g are similar to those of the embodiment of FIGS. 5d and 5e, and a row of six detection chambers 14 is mounted in mounting 60.

Again, each sample chamber 12 has a respective associated aperture 32 in the mounting. In this embodiment the mounting 60 is moveable and in order to obtain measurements of a selected one of a sample in a selected one of the sample chambers 12 the mounting is moved laterally so that an associated aperture is aligned with a laser or other light source (not shown). Thus by suitable movement of the mounting 60 measurement of the samples in each of the sample chambers 12 in turn, or for any selected one of the sample chambers, may be performed.

The apparatus of FIGS. 5f and 5g includes separate detection chambers 14 each associated with a corresponding sample chamber 12. In alternative embodiments a single common detection chamber may be used instead of the separate detection chambers, for example in similar fashion to that described in relation to FIGS. 5d and 5e.

Any suitable detection and analysis system may be used with the embodiments of FIGS. 1 to 5. In some embodiments a detection and analysis system as described in WO 2016/128747 is used. The content of WO 2016/128747 is hereby incorporated by reference. In some embodiments a light source in the form of a 635 nm wavelength laser is used (any light in the wavelength range 620-750 nm is used in some other embodiments). The laser in this embodiment is connected to a signal generator that is adapted to control a modulation frequency and phase of the laser output. The photodetector is connected to a digital phase sensitive detector (PSD). An input of an amplifier is connected to the signal generator. An output of the amplifier is connected to a digital oscilloscope 66. The PSD uses phase-sensitive detection to single out a component of the signal at a specific reference frequency and phase, in this case the modulation frequency that is set by the signal generator. Noise signals, at frequencies other than the reference frequency, are rejected and do not affect the measurement. An output from the digital oscilloscope is fed to a computer display.

The signal generator is arranged to modulate the output frequency of the laser source. As an example, the laser may be modulated at a frequency of 10 kHz with a phase of +169°, and a peak-to-peak amplitude of 200 mV. The detected signal is filtered by the PSD. The PSD filters the detected signal from the photodetector. The PSD synchronizes the detected signal with the modulation applied to the light source to provide a dampening system that eliminates unwanted noise, for example, background electrical or luminous noise. The filtered signal is sent to the digital oscilloscope to be recorded. The recorded signal can be displayed on the computer display.

Any suitable control and measurement circuitry may be used in alternative embodiments. For example, a lock-in amplifier, a signal generator and an analogue or digital oscilloscope may be used in some embodiments to module a laser or other light source and to detect the modulated detection signal. Alternatively any or all of those components may be replaced with a dedicated digital signal processing in the form of hardware, software or a suitable combination of hardware or software. Collimating lenses may be used to collimate the light input in some embodiments. Optical tubes/passages may be used to link optical components or chambers, for example the sample and detection chambers. Surfaces of chambers and/or passages and/or sample cell may be provided with reflective and/or diffusive layers for example an aluminium reflective layer and a titanium dioxide diffusive layer in some embodiments.

In some embodiments, the only active optical elements is the laser or are the lasers The laser(s) may be driven by signal generators (physical or virtual) to create an oscillating sine wave at, for example, 10 kHz. In some embodiments scattering from this laser signal is detected by a passive photodiode and relayed to a LIA which filters the noise and reports only the oscillating laser signal. The laser signal may conducted to the sample by passive optical fibers in some embodiments.

The apparatus according to embodiments may be used to detect the presence of organisms in a liquid sample. The organism may comprise micro-organisms. In some embodiments, the organism is bacteria. The sample can be one of a variety of different types of sample, for example, one or more of blood, blood plasma, urine, water, bacterial growth fluid, cerebrospinal fluid (CSF), pus, or joint aspirate.

In some embodiments, a plurality of apparatuses are provided together. As an example, there is more than one apparatus, a single light source and a light guide arrangement. The light guide arrangement comprises a plurality of light guiding elements for example, fibre optics. The light guide arrangement also has a light selection element, for example, an optical switch, a splitter or router to select light to be passed from the light source to the plurality of fibre optics. Each fibre optic guides light from the light source to a respective apparatus. Each optical fibre arrangement can be provided as a fibre optic cable or a bundle of said cables.

By providing an arrangement including a plurality of fibre optics, variations in operating conditions for each sample may be reduced. For example, any variation relating to operation of different lasers for different sample chambers is eliminated as only one laser is provided for all sample chambers.

As described above, in some embodiments, the sample chamber is removable from the detection chamber. In further embodiments, a coupling mechanism and driving arrangement is provided. The coupling mechanism is operable to couple the sample chamber to the detection chamber so that the light from the sample chamber (e.g. scattered/reflected light) can be communicated to the detection chamber, for example substantially as described above. The driving arrangement is configured to drive the coupling mechanism.

The driving arrangement may be operable by electro-mechanical means, under software and/or electronic control. The driving arrangement may comprises a motor. A further control apparatus is provided to control the driving arrangement. The driving arrangement may be electrically, magnetically and/or electro-magnetically powered. Although described above as driven by the driving arrangement, in some embodiments, the coupling mechanism is operated manually.

The coupling mechanism couples the sample chamber with the detection chamber. In further detail, the coupling mechanism is operable to move one or both of the sample chamber and detection chamber to obtain relative movement.

It will be understood that a coupling mechanism can be provided that couples any of the sample chamber, detection chamber, sample cell and light source. In some embodiments, instead of moving one or both of the sample and detection chambers, the coupling mechanism is configured to maintain the sample chamber and detection chamber in a fixed spatial relationship and to move the light source relative to the sample chamber and the detection chamber.

The coupling mechanism is configured to allow the sample chamber to be placed into a coupled configuration with the detection chamber. In the coupled configuration, the sample chamber and detection chamber can operate as described above. In particular, in the coupled configuration, the exit aperture of the sample chamber is aligned with the input aperture of the detection chamber. In the coupled configuration, there is an optical path between the sample chamber and the detection chamber. In the coupled configuration, a signal can be detected for the sample.

In embodiments with a light source, where the light source is moveable relative to the sample chamber, it will be understood that the coupling mechanism may be operable such that the light source and the sample chamber can also be placed into a coupled configuration in which the light source is aligned with light input of sample chamber.

In further embodiments, a plurality of sample chambers are provided, together with a single detection chamber, a coupling mechanism and a driving arrangement. The coupling mechanism is operable to place one of the plurality of sample chambers in a coupling configuration or coupling position with the detection chamber, as described above. The coupling mechanism places one sample chamber in the coupling configuration at a time. In some embodiments, the coupling mechanism places the sample chamber into the coupling position in a sequence, which may be pre-determined. In some embodiments, the coupling mechanism places successive sample chambers into the coupling position with the detection chamber.

The coupling mechanism may move linearly or by rotation. The coupling mechanism and driving arrangement may comprise a conveyer-type or a carousel-type system driven by a motor for moving the plurality of sample chambers to pass the detection chamber. The coupling mechanism may have a further controller to stop said movement when a sample chamber is in the coupled position. This may use further sensors to detect position of the sample chamber relative to the detection chamber and/or to detect alignment between the two chambers or their respective apertures. This embodiment may allow for large a higher throughput of samples to be tested, for example, in a clinical laboratory environment.

FIGS. 6 to 10 illustrate results obtained from using an apparatus according to embodiments.

Figure 6:
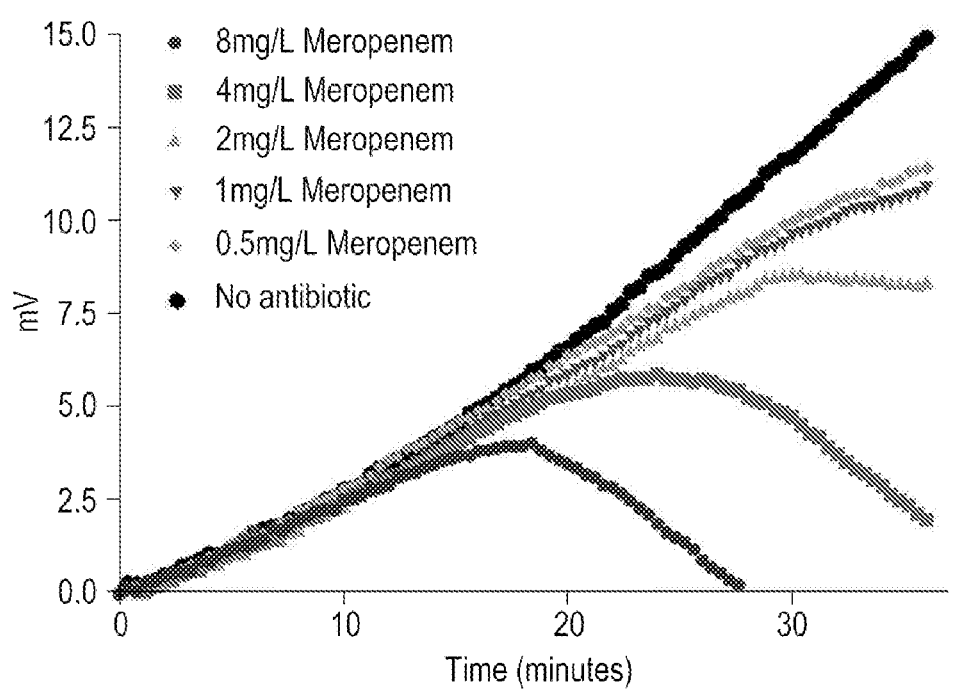
FIG. 6 is a plot of bacterial growth as a function of time of biological samples in the presence of different concentrations of a first type of antibiotic (meropenem)

FIG. 6 is a plot of detector output (in mV) as a function of time showing bacterial growth of biological samples in the presence of different concentrations of a first type of antibiotic (meropenem). The biological sample is *E. coli*. The upper line represents bacterial growth in a control well with no antibiotics. This result shows the natural growth of the organism achieving significant amounts in a very short time. The five other lines shown in the plot represent results of the growth of the organism in the presence of increasing concentrations of meropenem. The plot shows that the minimum inhibitory concentration (MIC) of this organism is less than 2 mg/L. The plot also shows that selecting a higher concentration of meropenem above this value leads to a faster deviation from the control line. Results may be provided in much less than 30 minutes. Additionally, the plot also shows the mode of action of meropenem as this drug causes lysis and a reduction in scattering.

Figure 7:
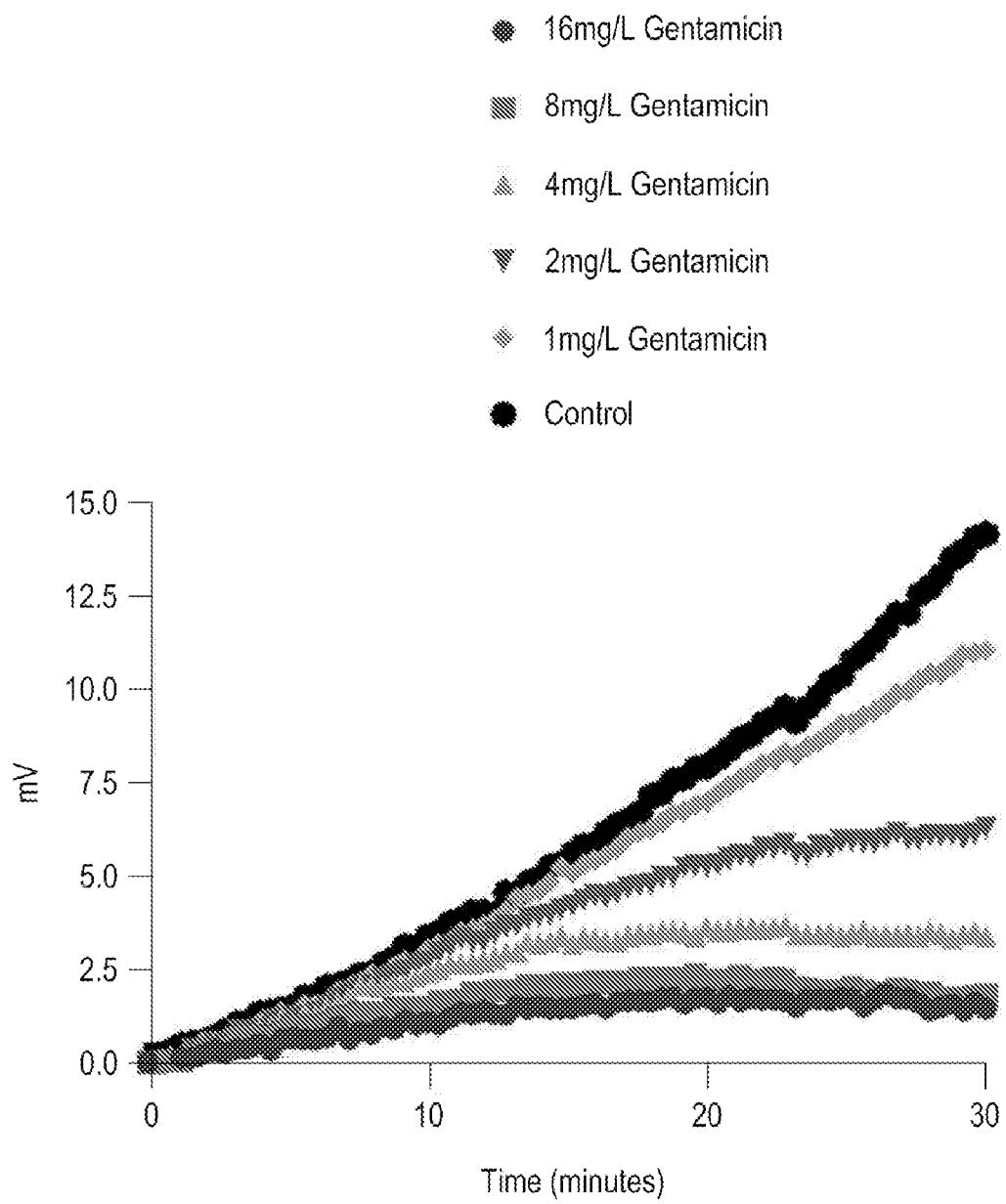
FIG. 7 is a plot of bacterial growth as a function of time of biological samples in the presence of different concentrations of a second type of antibiotic (gentamicin)

FIG. 7 is a plot of bacterial growth as a function of time of biological samples in the presence of different concentrations of a second type of antibiotic (gentamicin). The results are similar to those shown in FIG. 6. The plot of FIG. 7 shows that the MIC for the organism against gentamicin is below 2 mg/L As described with reference to FIG. 6, the higher above the concentration of the antibiotic from the MIC level, the faster the test line deviates from the control line. The scattering remains static once the organism is killed.

Figure 8A:
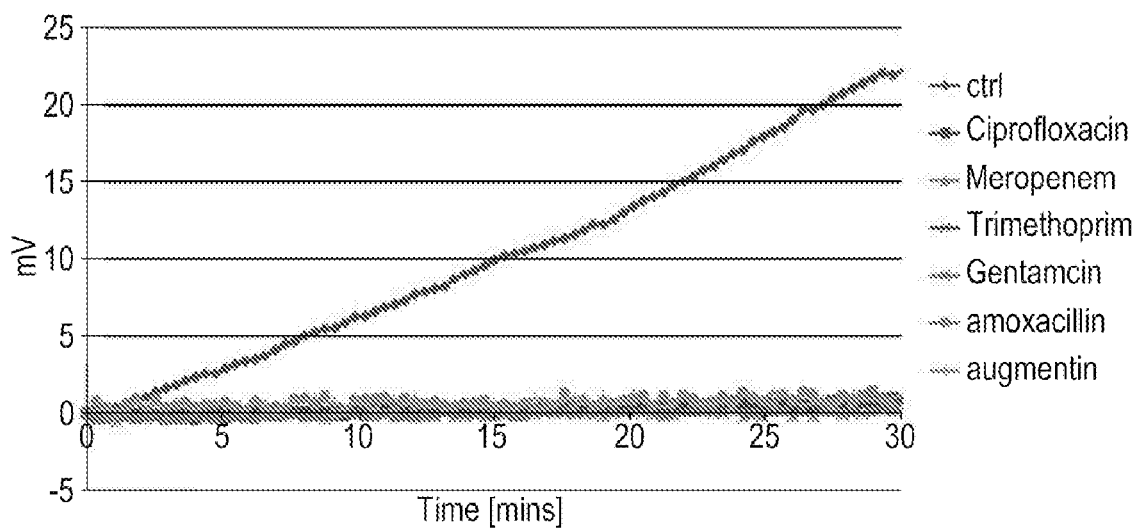
FIG. 8(a) and FIG. 8(b) are plots showing bacterial growth of samples as a function of time in the presence of different types of antibiotics.
Figure 8B:
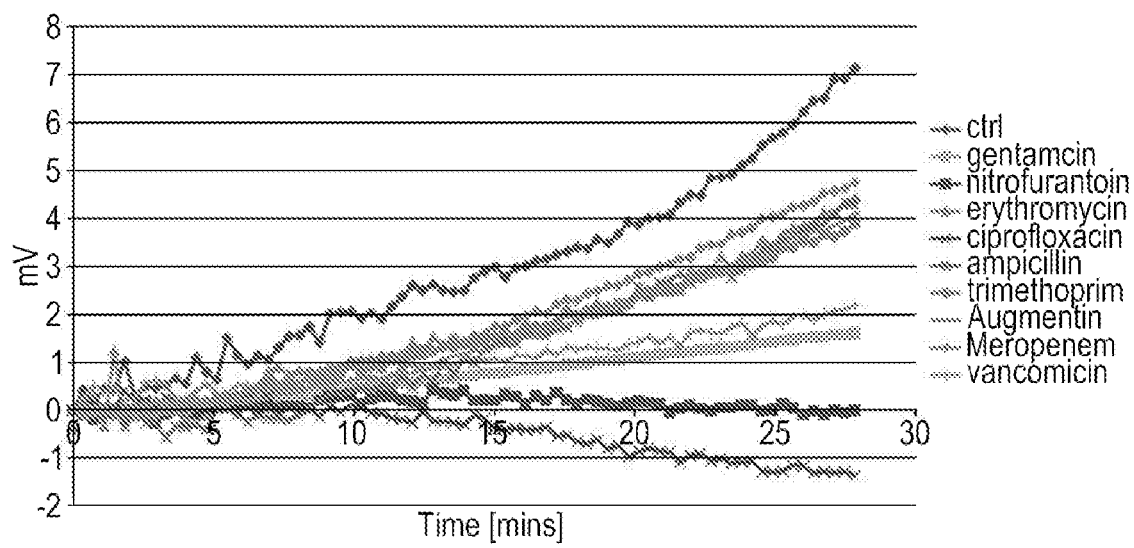

FIG. 8(a) and FIG. 8(b) are plots showing bacterial growth of samples as a function of time in the presence of different types of antibiotics. FIGS. 8(a) and 8(b) illustrate break points for different types of antibiotics. Measurements derived using the data shown in FIGS. 8(a) and 8(b) are shown in Table 1 and Table 2, respectively.

TABLE 1

| Antibiotic | Reference (Vitek 2 result) Mg/L | Concentration Used (EUCAST Breakpoint) (mg/L) | Time To Results (mins) |
|---|---|---|---|
| Gentamicin | ≤1 | 4 | 0.73 (S) |
| Meropenem | ≤0.25 | 8 | 2.57 (S) |
| Nitrofurantoin | | 64 | |
| Tazobactam | | 4 | |
| Trimethoprim | ≤0.5 | 4 | 0.73 (S) |
| Augmentin (co-amox) | 2 | 8 | 2.2 (S) |
| Ampicillin | 8 | 8 | |
| Ciprofloxacin | ≤0.25 | 0.5 | 4.4 (S) |
| Amoxicillin | | 32 | 2.93 (S) |
| Moxifloxacin | ≤0.25 | | |

TABLE 2

| Antibiotic | Reference (Vitek 2 result) Mg/L | Concentration Used (EUCAST Breakpoint) (mg/L) | Time To Results (mins) |
|---|---|---|---|
| Erythromycin | 1 | 1 | 3.3 (S) |
| Nitrofurantoin | 16 | 32 | 3.37 (S) |
| Augmentin | ≤2 | 2 | >30 (R) |
| Ampicillin | >0.5 | 1 | >30 (R) |
| Ciprofloxacin | 0.5 | 1 | 3.37 (S) |
| Vancomycin | 1 | 2 | 7.33 (S) |
| Gentamicin | 0.5-8 | 1 | 0.37 (S) |
| Meropenem | | 4 | 2.2 (S) |
| Trimethoprim | 0.5-2 | 8 | 7.33 (S) |

Figure 9:
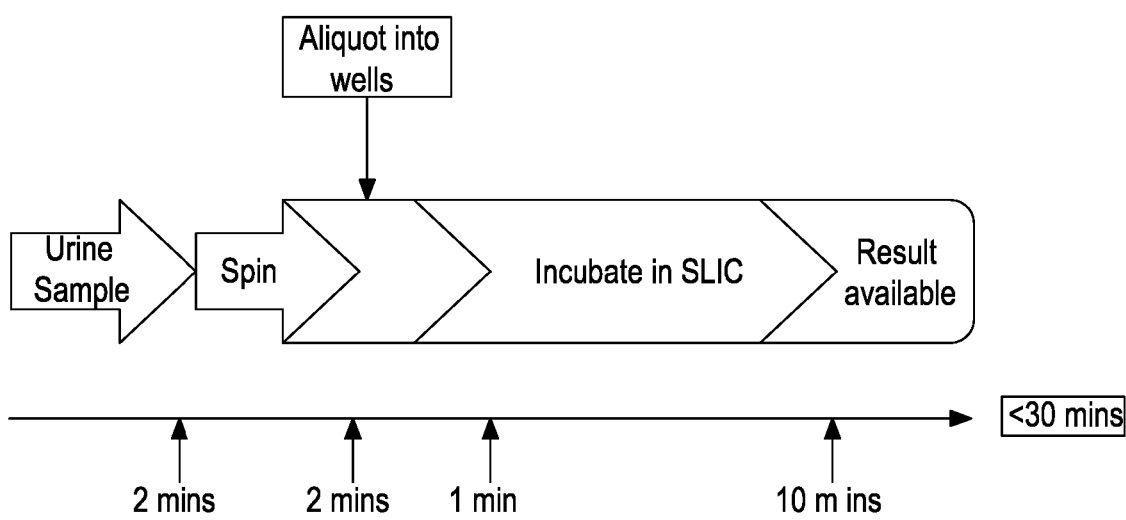
FIG. 9 is a schematic diagram illustrating use of the detection apparatus.

FIG. 9 is a schematic diagram illustrating a method of use of the detection apparatus. The use shown in FIG. 9 is for a rapid diagnosis of a urinary tract infection. However, this is shown as a non-limiting example, only.

As a first stage a biological sample containing urine is obtained. A spinning process is applied to the sample and the sample is aliquoted or otherwise divided into wells. The samples are then incubated in an incubator. After a pre-determined time, each sample, in a sample chamber, is moved into a detection configuration with the detection apparatus. This may involve placing the sample in a cuvette into the sample chamber. This may involve sequentially moving a plurality of sample chambers into the detection configuration. More than one measurement for each sample may be performed and stored to establish growth curves, for example, those shown in FIGS. 6, 7, 8 and 10.

Figure 10:
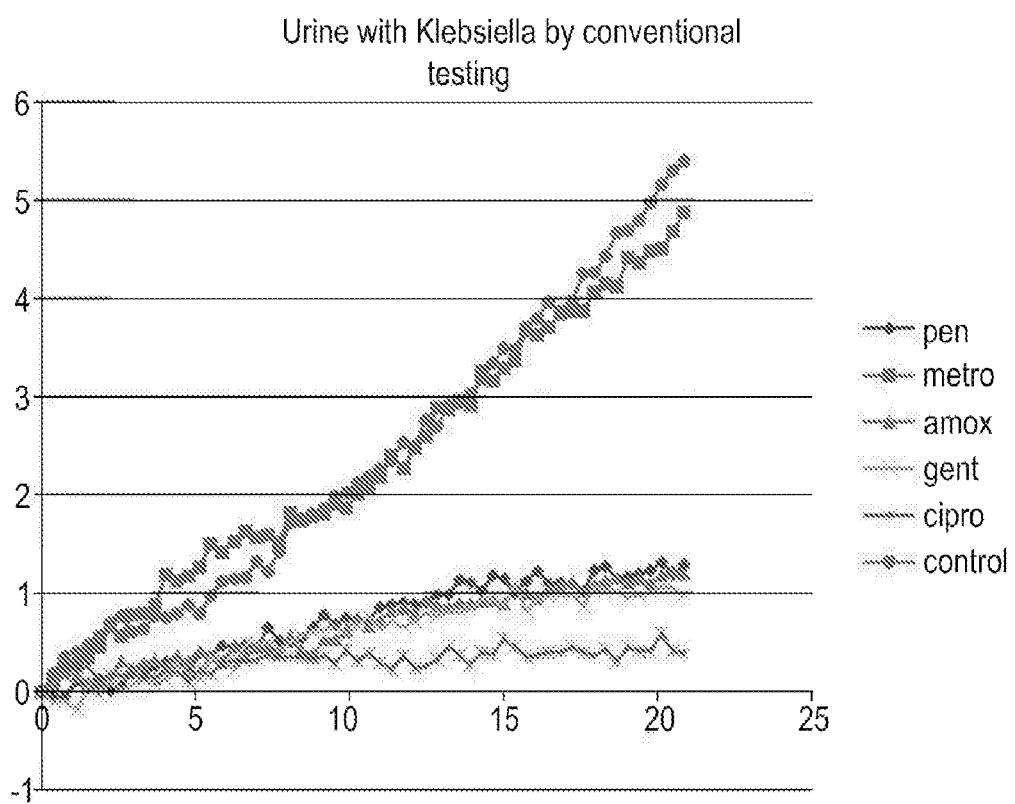
FIG. 10 is a plot of bacterial growth as a function of time of urine samples in the presence of different types of antibiotics.

FIG. 10 is a plot of bacterial growth as a function of time in urine samples in the presence of different types of antibiotics. The urine samples contain a significant amount of *Klebsiella* resistant to meropenem and susceptible to penicillin, amoxicillin, gentamicin and ciprofloxacin. The control line is the upper most line.

The second upper most line correspond to results for a urine sample treated with meropenem. The second upper most line overlaps in part with the control line. The urine sample is thus shown to be resistant to meropenem. The other lines correspond to results for urine samples treated with ciprofloxacin, gentamicin, penicillin and amoxicillin. These results therefore show that the urine contains bacteria that is susceptible to ciprofloxacin, gentamicin, penicillin and amoxicillin.

In some embodiments, as described above, a plurality of sample chambers are provided together with a single detection chamber, a coupling mechanism and a driving arrangement to successively move the sample chambers into a coupling position with the detection chamber. In further embodiments, the plurality of sample chambers may be provided as part of a structure, for example, a sample cassette for use with the single detection chamber, coupling mechanism and driving arrangement. FIGS. 11 to 15 show a sample container 70 for containing a collected liquid sample, for example a urine sample, and a base portion that has a sample cassette having a plurality of sample chambers. In use, each sample chamber may contain a different antibiotic and/or growth medium to be tested. A distribution mechanism is provided, for example as part of the base portion, that distributes at least part of the collected liquid sample to between the plurality of sample chambers. By moving the cassette, the plurality of sample chambers are successively placed in a coupling position with a single detection chamber allowing measurement of samples in each of the sample chambers to be performed. The sample container including sample cassette provide a system that allows a single sample to be tested against a number of different antibiotics.

Figure 11A:
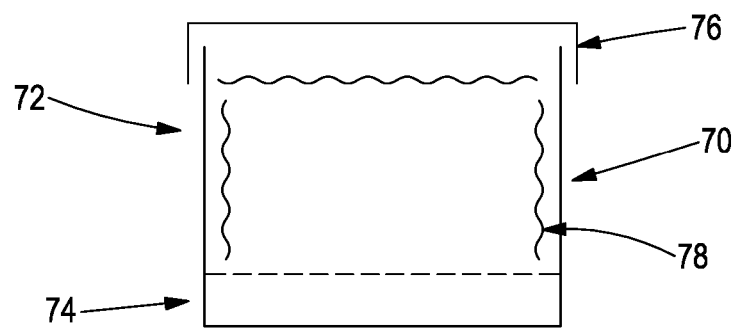
FIG. 11 is a schematic diagram illustrating a sample container.
Figure 11B:
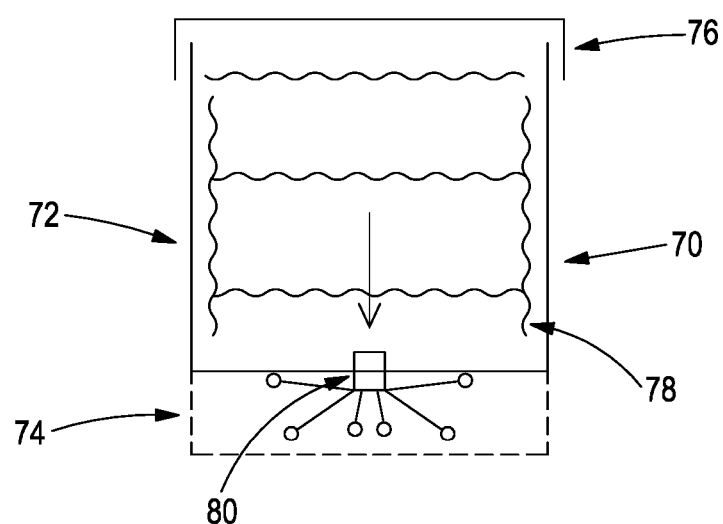

In further detail, FIG. 11 is a schematic diagram of a sample container 70 in accordance with embodiments, for use with a detection apparatus. FIGS. 15(a) to 15(k) also show perspective views of the sample container 70. The sample container 70 is cylindrical. In alternative embodiments, other geometries of the sample container are provided.

The sample container 70 has an upper container portion 72, which may also be referred to as an upper collection portion, and a removable base portion 74. The container portion 72 has an upper opening to allow a liquid sample, also referred to as the collected sample, to be deposited inside the upper container portion. The upper opening corresponds to substantially the upper end of the cylinder. In some embodiments, the upper opening may correspond to part of the upper end of the cylinder. As shown in FIG. 12 and FIG. 15, the removable base portion 74, provides a sample cassette for use with the detection apparatus that has a plurality of sample cells for containing portions of the collected sample to be tested in the detection apparatus. A removable lid 76 is also provided at the upper opening of the sample container 70 to open and close the sample container 70 at its upper surface. In some embodiments the lid may provide a seal for the upper container 72.

In some embodiments, the removable lid is flat. In other embodiments, the removable lid comprises a recess such that, when the lid is attached to the sample container and the sample container is inverted, by turning upside-down, sediment and other undesired particulate matter is collected in the recess of the lid.

The upper container portion 72 and lid 76 provides an enclosed space for holding a sample, for example, a urine sample. The container portion 72 has inner adhesive surfaces 78. The lid 76 also has an inner adhesive surface. The inner surface of the base of the container portion 72 is treated to be a repellent surface. The internal adhesive surfaces are treated such that sediment in the sample adheres to the internal adhesive surfaces. The internal adhesive surfaces may be treated by one or more adhesive substances or may comprise a rough plastic surface.

A separation or purification process to separate or purify the sample inside the container portion 72 can be performed by spinning the cylindrical sample container 70 about its axis and therefore causing the liquid to rotate. Sediment in the sample is thus forced to the adhesive surfaces by forces arising from rotation of the container and adheres to said adhesive surfaces.

The upper container portion 72 and the lower base portion 74 are attachable and detachable to one another by an attachment mechanism. In some embodiments, the lower base portion 74 is attachable and detachable to the upper container portion 72 by twisting. Any suitable attachment mechanism configured to be locked may be used, for example, a threaded screw fastening or a bayonet fastening. In some embodiments, a luer-lock type system is provided between the upper and base portion to allow locking and unlocking of the base portion to the upper container portion.

Figure 15A:
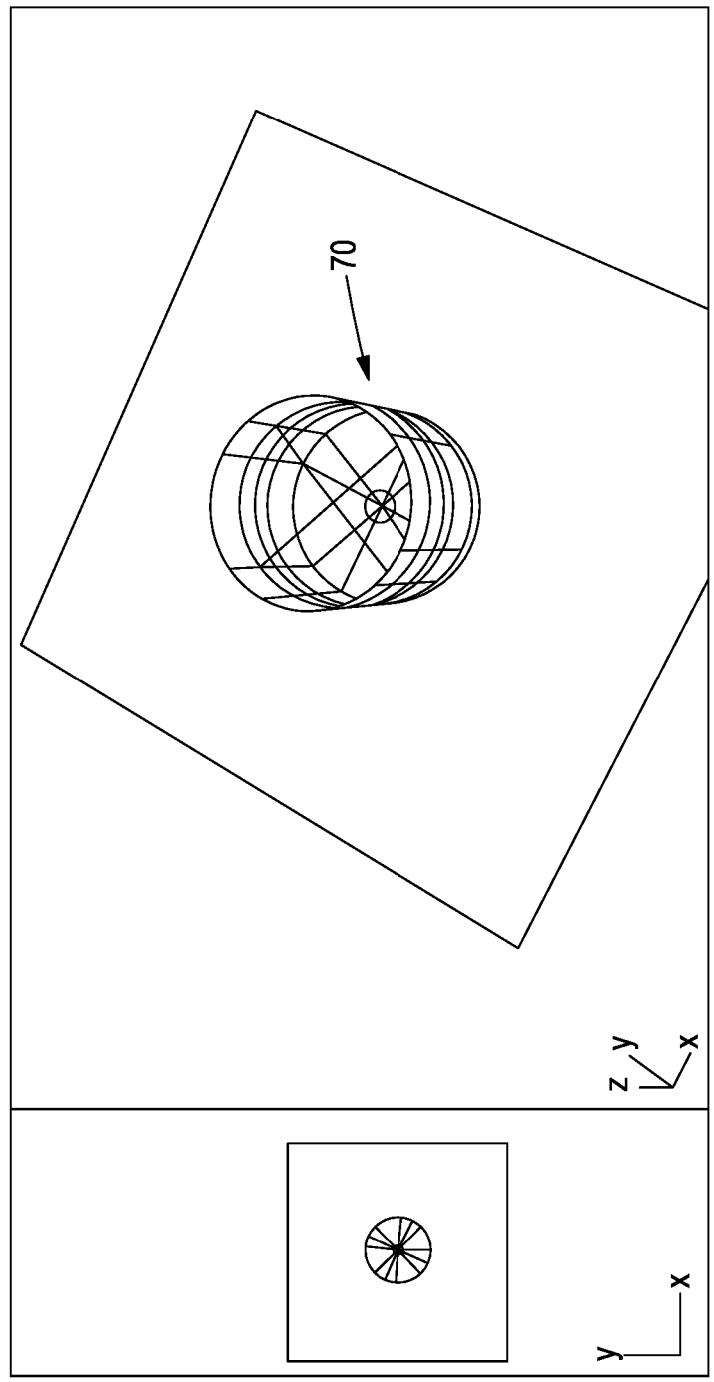
Figure 15B:
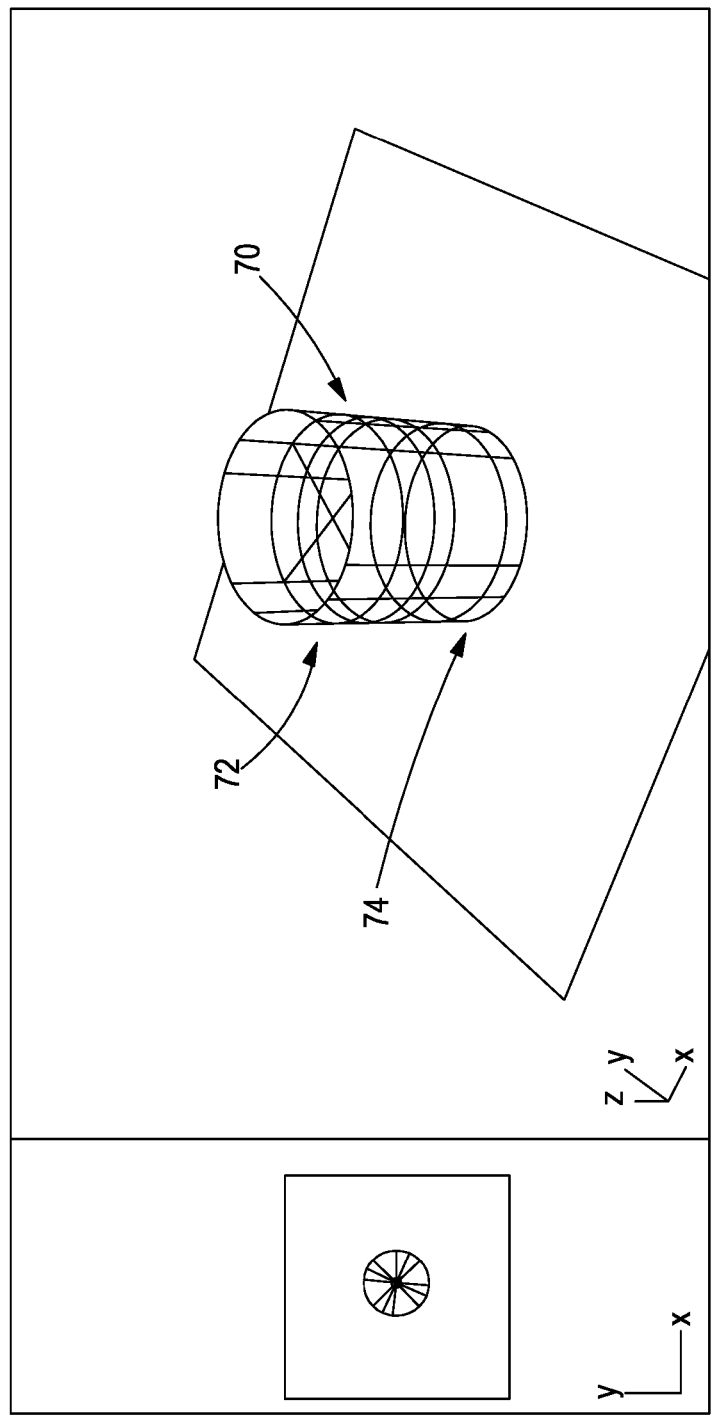
Figure 15D:
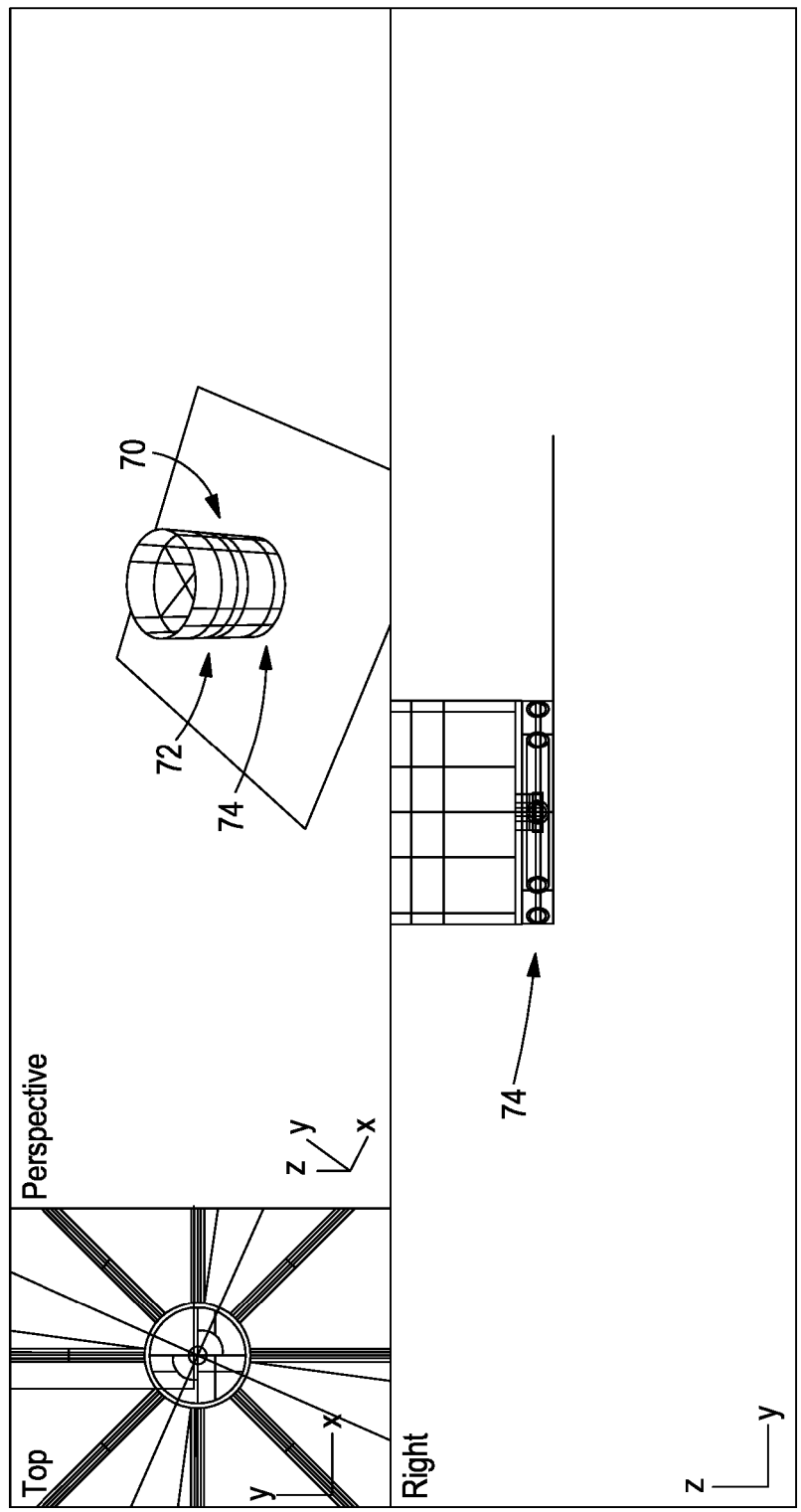
Figure 15E:
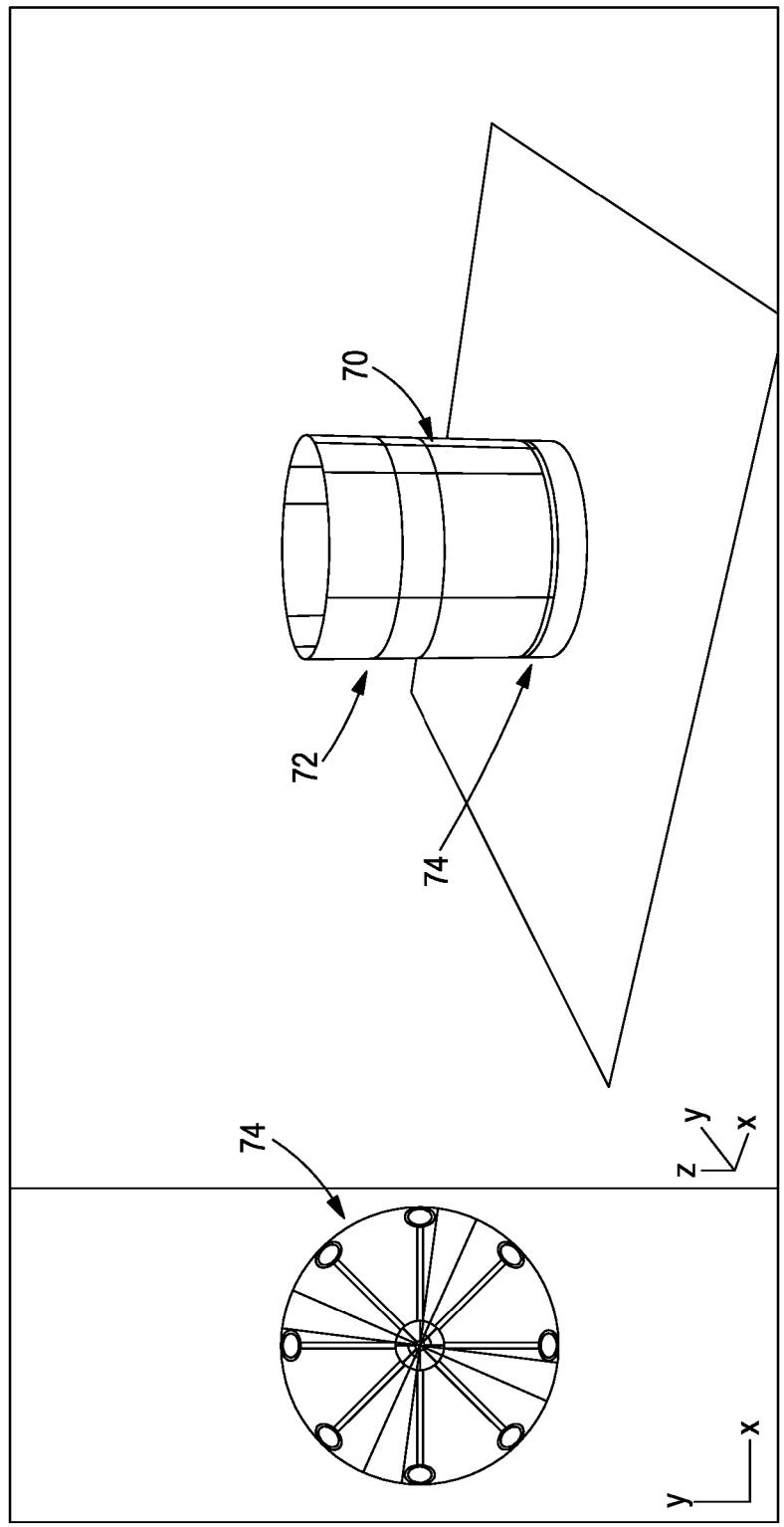
Figure 15F:
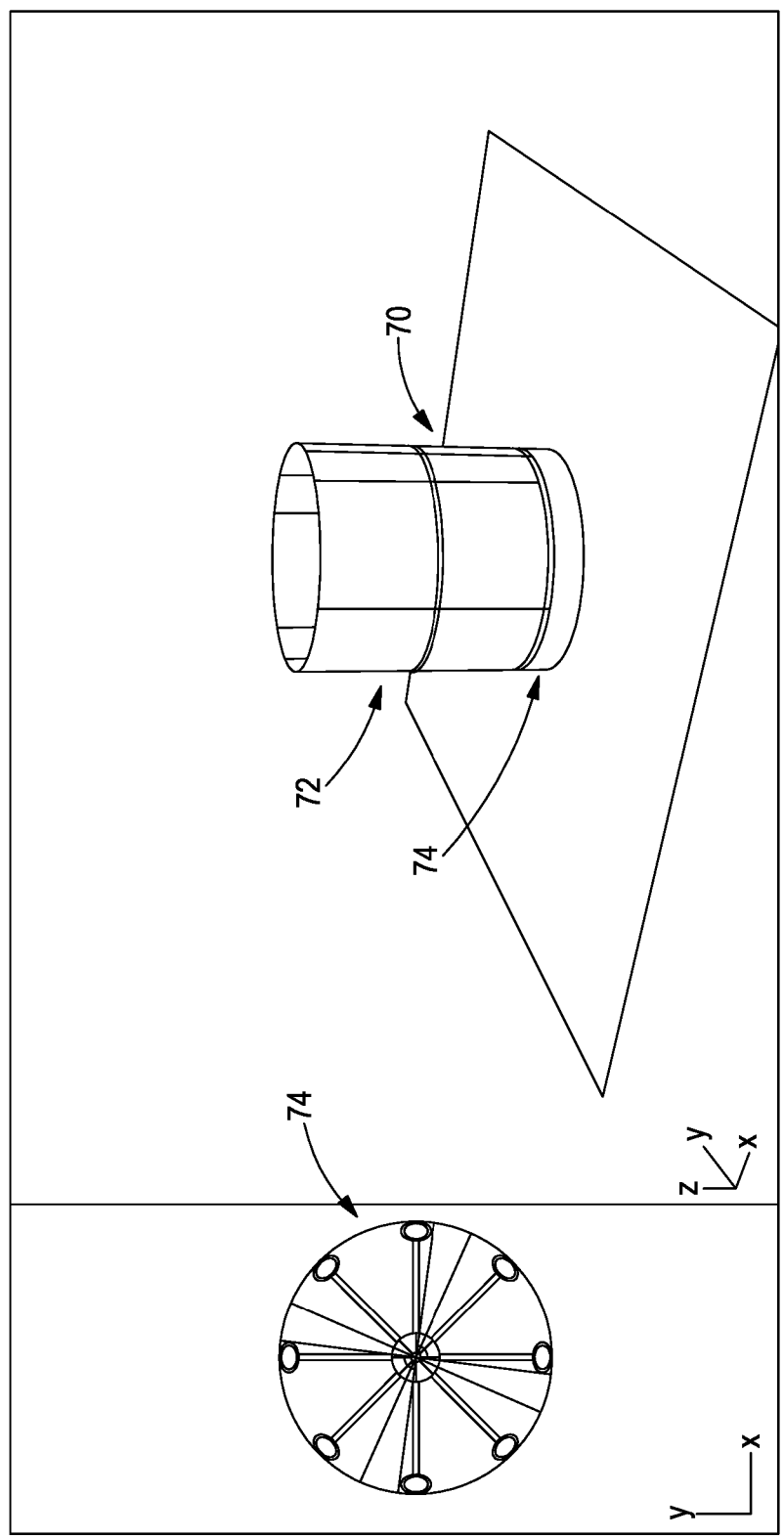
Figure 15G:
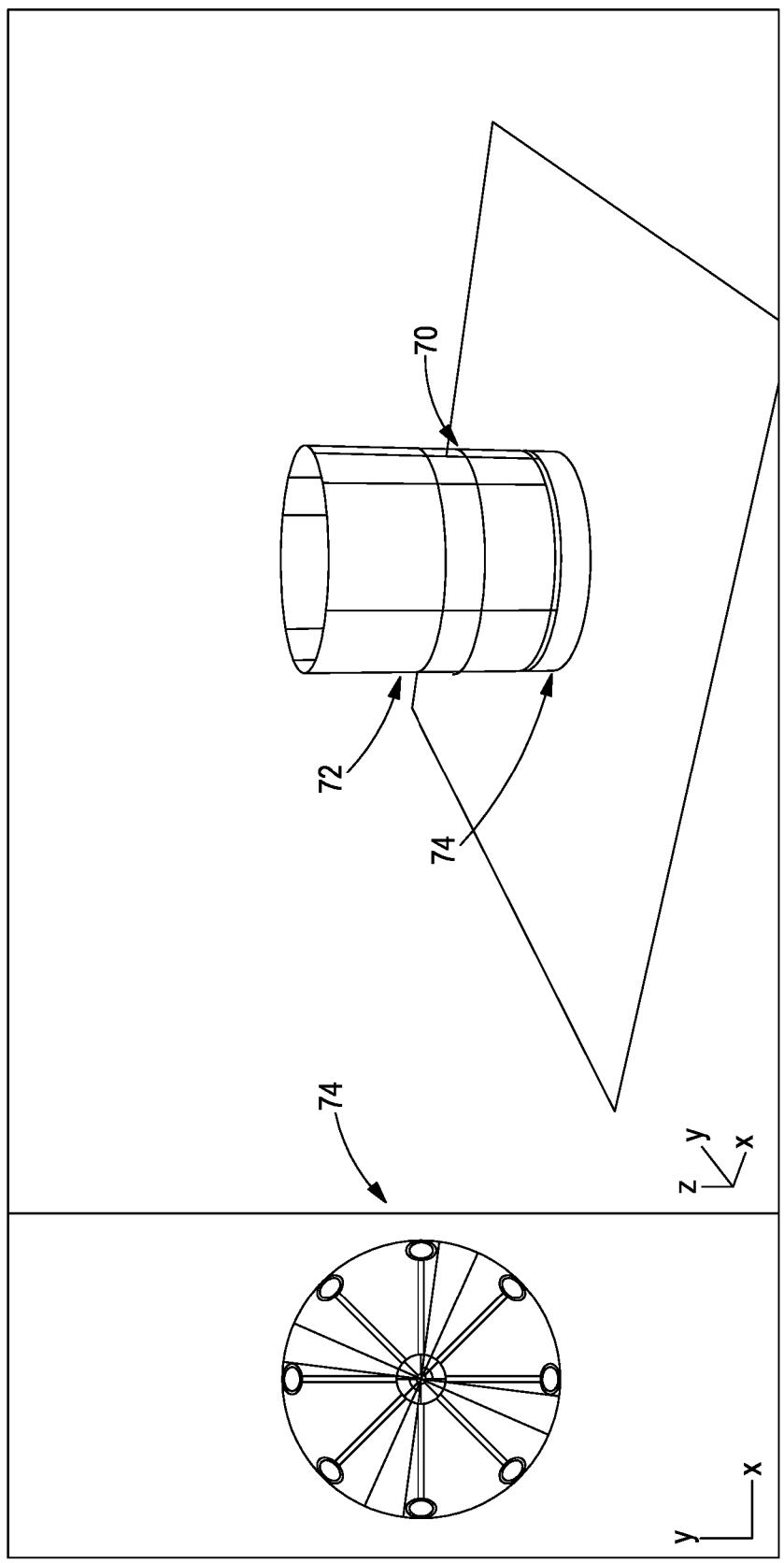
Figure 15H:
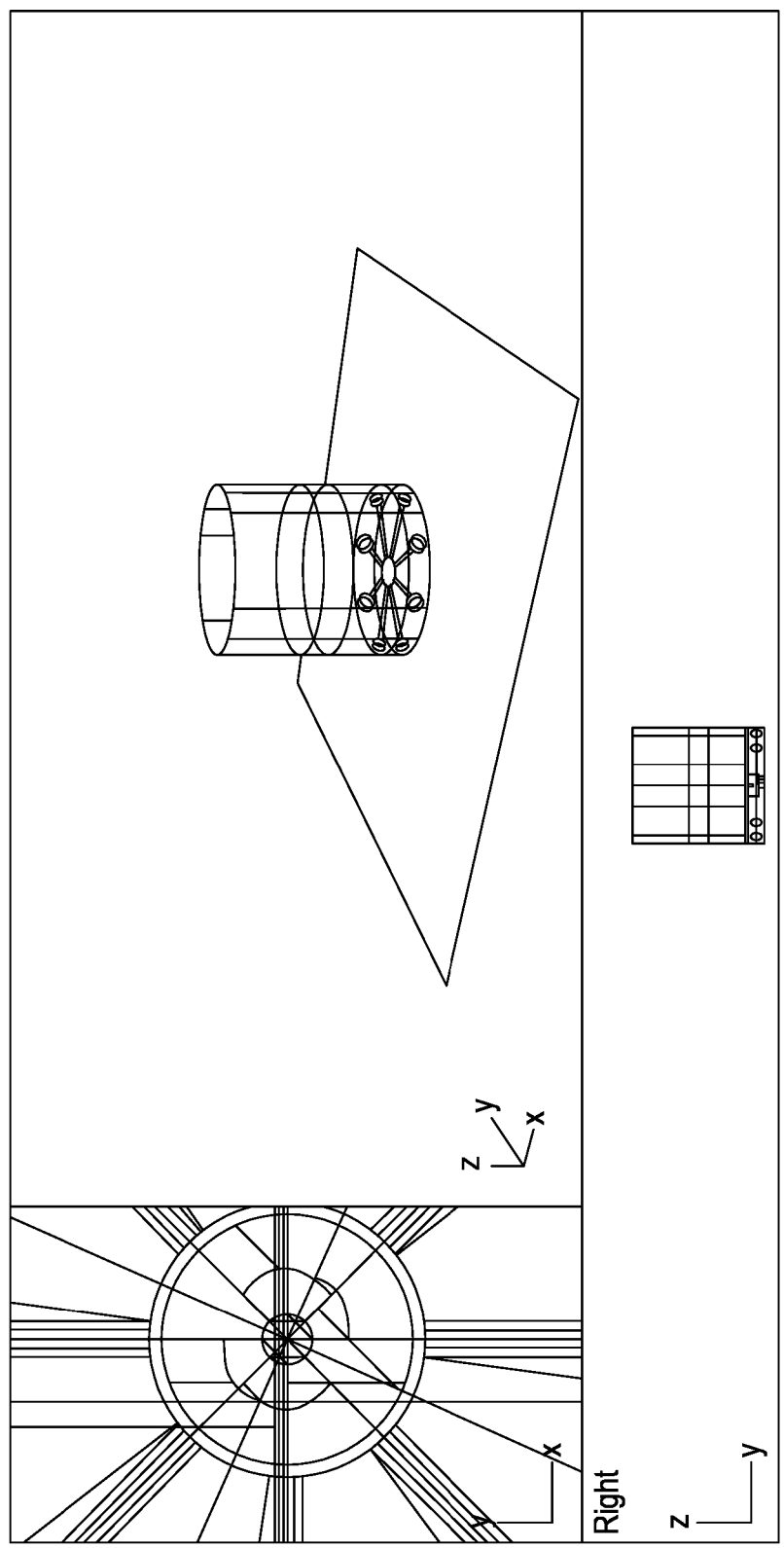
Figure 15I:
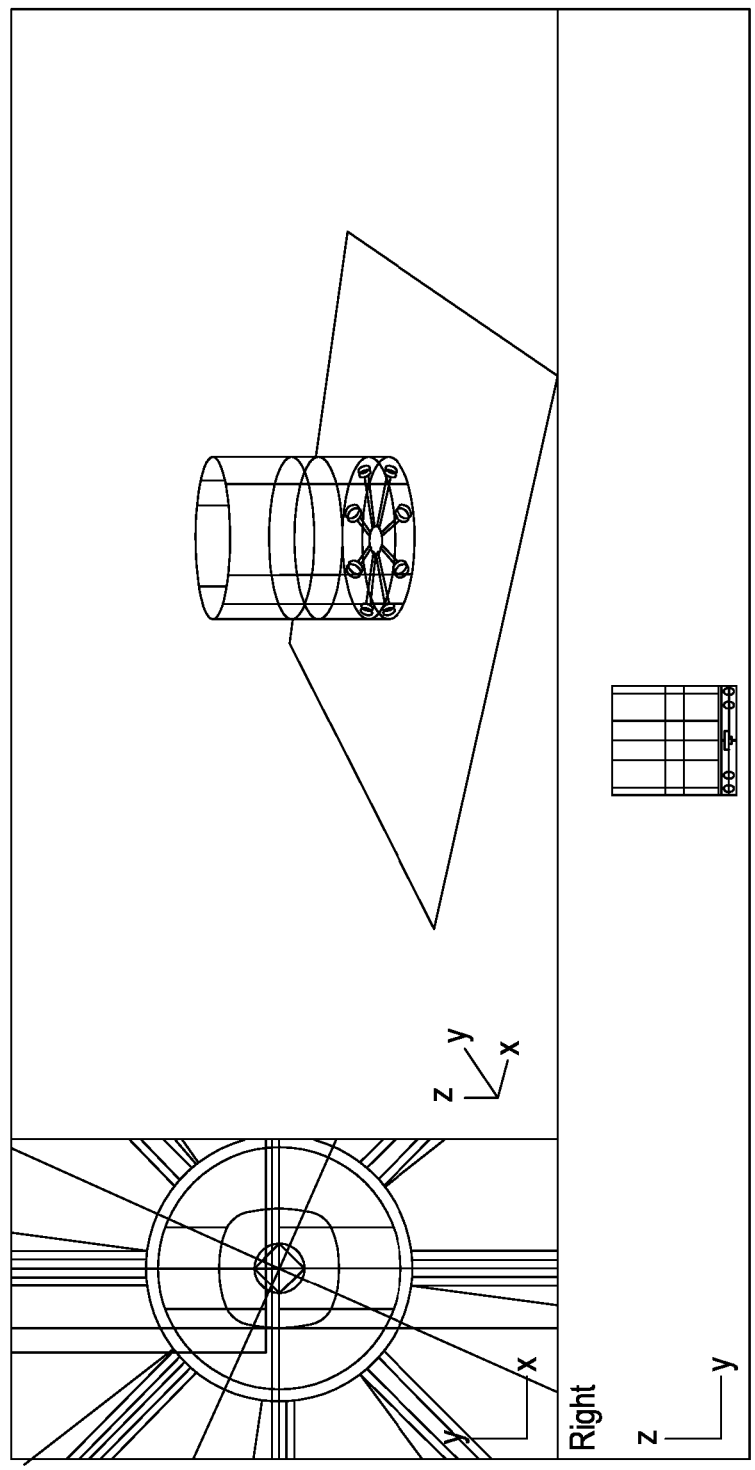
Figure 15J:
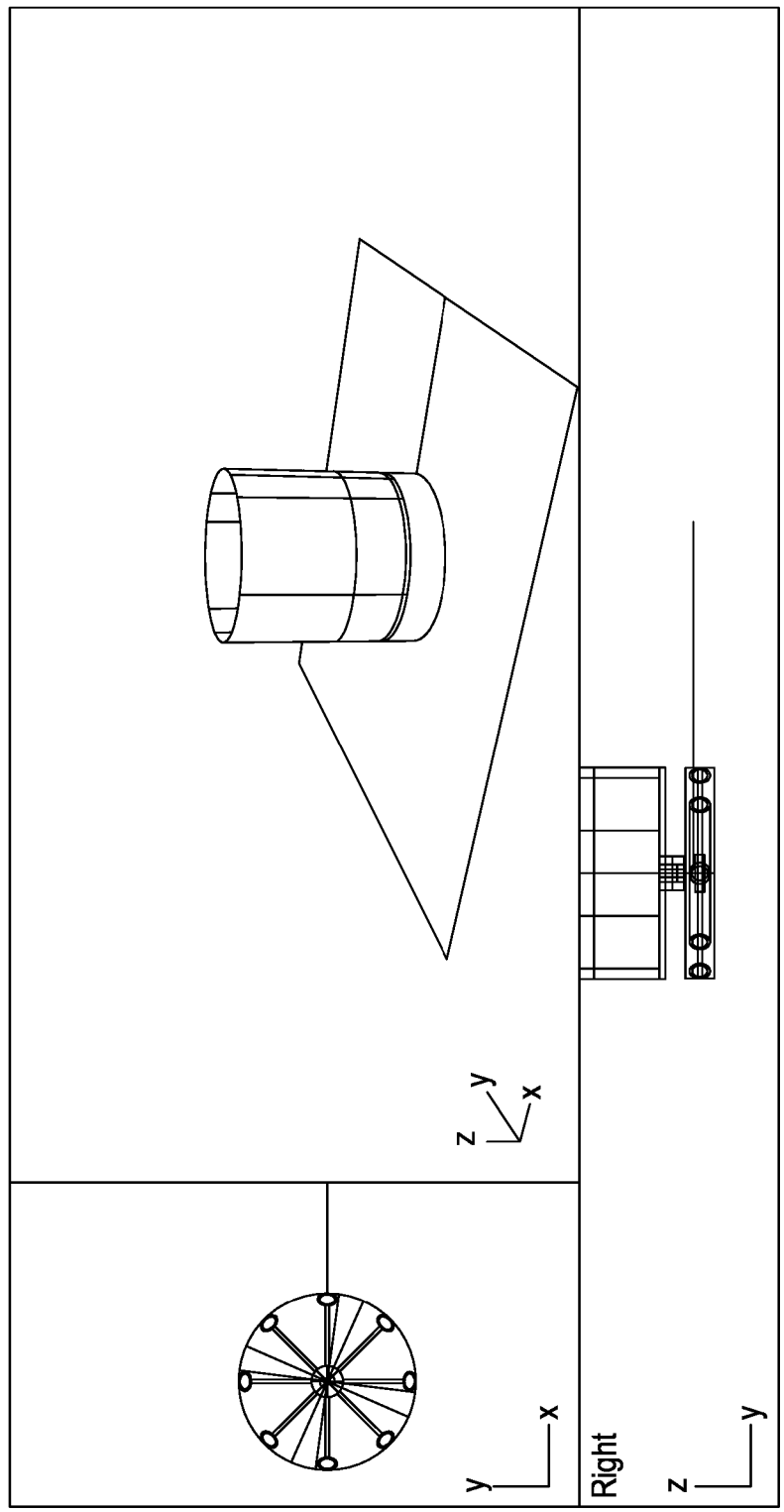
Figure 15K:
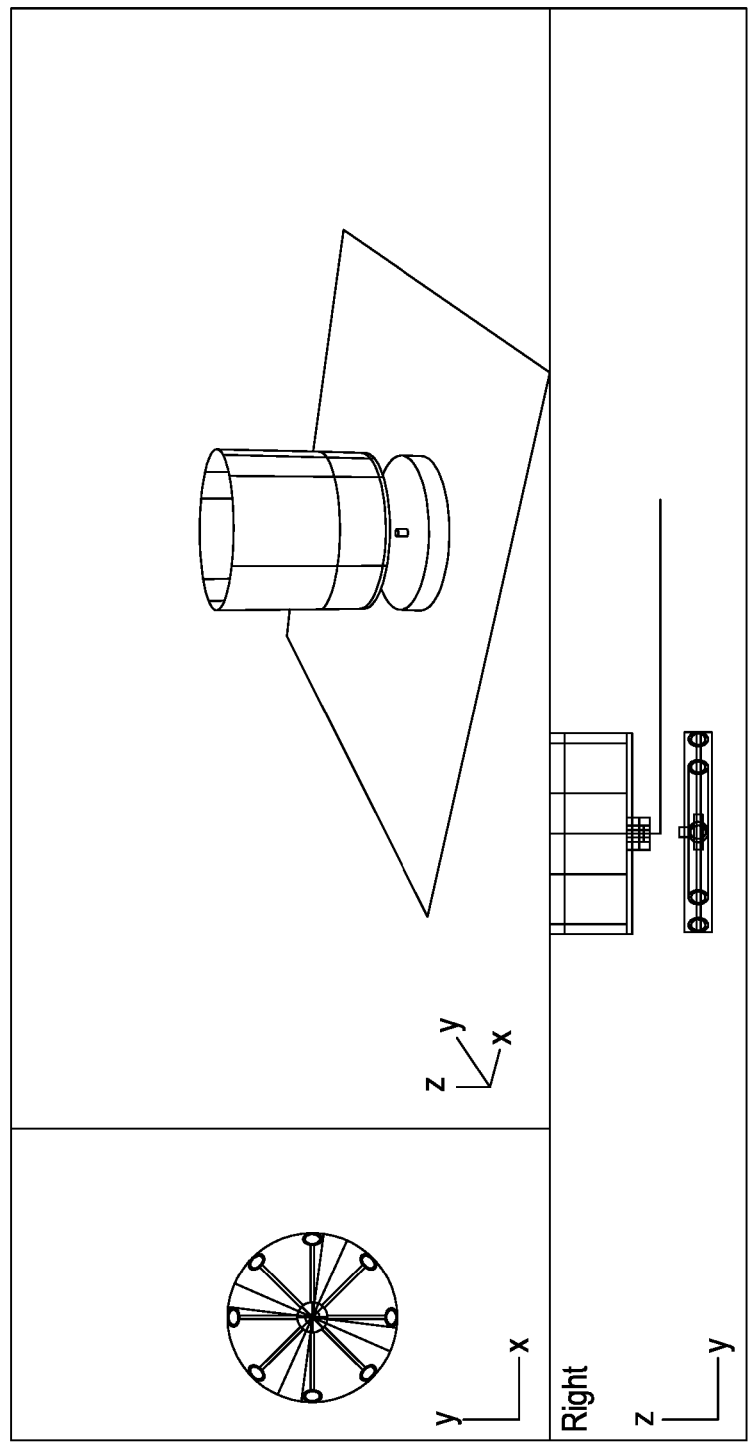

As shown in further detail in FIG. 15, in particular, FIGS. 15(j) and (k), the attachment mechanism comprises a plug and socket mechanism. The base portion has a threaded screw member, which may be tapered, and the upper container has a corresponding threaded aperture sized to receive the screw member. The base portion is attached by positioning the base portion 74 such that the threaded screw is aligned with the aperture of the upper container 72 and partially inserting the threaded screw into the aperture, before rotating the base portion to secure to the upper container.

In some embodiments, a plurality of plastic tabs are provided in a ring about the circumference of the container 70 to join the lower base portion 74 to the upper container portion 72. The plastic tabs are breakable. The plastic tabs secure the lower base portion 74 to the upper container prior to first use of the container. Unbroken plastic tabs also provide an indication to a user that the container has not yet been used.

The container also has an open-close valve mechanism 80 between the upper portion 72 and the base portion 74. The valve mechanism 80 comprises an opening between the upper portion 72 and the base portion 74 and a moveable member for closing the opening. The valve mechanism is operable to move between an open configuration, in which, liquid is permitted to move from the upper container 72 to the base container 74 and a closed configuration, in which, liquid is prevented from moving from the upper container portion 72 to the base portion 74. In use, in the open configuration, the collected sample in the upper container portion 72 is distributed to the plurality of sample chambers of the base portion 80 for testing.

Figure 12A:
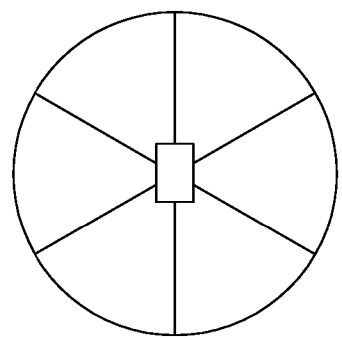
FIG. 12 is a schematic diagram illustrating a base portion of the sample container.
Figure 12B:
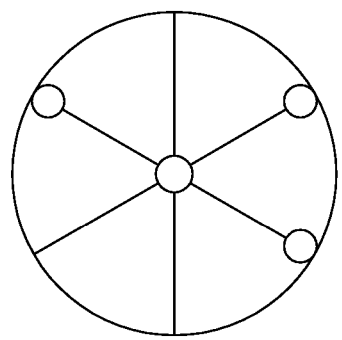

FIG. 12(a) shows a first embodiment of the removable base portion. FIG. 12(b) shows a second embodiment of the removable base portion. In particular, FIGS. 12(a) and 12(b) show different embodiments of a distribution mechanism for distributing a collected sample from the upper container portion 72 to the plurality of sample chambers of the base portion 74.

Both the first and second base portions of FIG. 12(a) and FIG. 12(b) have a plurality of sample cells. In use, each sample cell is provided with a different antibiotic to be tested. The sample liquid is then introduced into each sample cell at an opening which is positioned at the centre of the disc and conveyed to the sample cells. The samples in each sample cell are then tested using the detection device.

In some embodiments, the opening of the base portion is the opening of the valve mechanism. In some embodiments, the base portion 74 and valve mechanism of the upper container 72 are configured such that the opening of the base portion 74 is aligned with the opening of the valve mechanism when the base portion 74 is attached.

FIG. 12(a) shows a disc divided into a plurality of segments through a plurality of dividing walls, each segment providing a sample cell. FIG. 12(b) shows a plurality of sample cells at an outer edge of the disc and each sample cell having an associated channel for conveying liquid from the entrance to the sample cells.

Figure 13A:
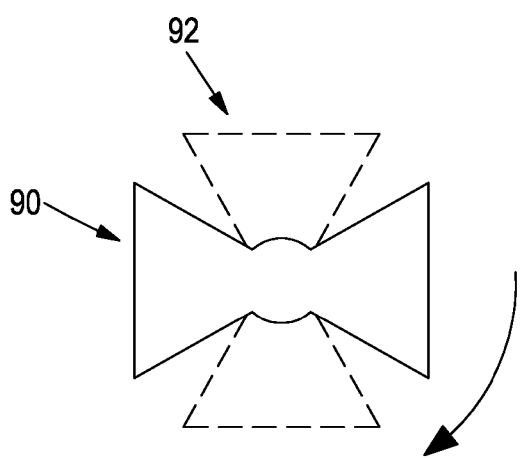
FIG. 13 is a schematic diagram illustrating a valve mechanism of the sample container.
Figure 13B:
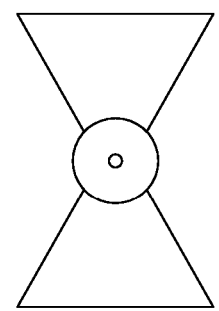

FIG. 13 shows a valve mechanism in accordance with some embodiments. FIG. 13(a) shows the valve mechanism in the open configuration and FIG. 13(b) shows the valve mechanism in the closed configuration. The valve mechanism has a an opening 92 and a moveable member 90 rotatable about a central axis. In some embodiments, more than one independently moveable member is provided. In some embodiments, the opening is provided on one of the base portion or the upper container and the member is provided as part of the other of the base portion or the upper container. In other embodiments, both the opening and the moveable member are provided as part of either the base portion or the upper container.

As shown in FIG. 13(a) the moveable member has two arms that are moveable to cover the opening 92. FIG. 13(b) shows the valve mechanism in the closed configuration. FIG. 15 shows further views of the valve mechanism.

In some embodiments, the valve mechanism is independent of the attachment mechanism such that the two portions can be secured and locked together independently of permitting liquid to flow between the two portions.

In other embodiments, the valve mechanism is activated by the attachment mechanism.

In some embodiments, the valve mechanism and the attachment mechanism are both activated by the same movement or action of one or more of the upper container and the base portion. In the embodiments described with reference to FIGS. 11 to 15, a separate base portion 74 and upper container 72 are attached together by aligning and twisting of the base portion 74. As the threaded screw of the base portion is rotated inside the corresponding aperture of the upper container, the valve mechanism, in this embodiment part of the upper container, is activated. The threaded screw of the base portion thereby couples to the valve mechanism, such that further rotation of the base portion moves the moveable arms of the valve mechanism. In this way, the valve mechanism is opened when securing the base portion to the upper container.

In some embodiments, the attachment mechanism is coupled to the valve mechanism. In some embodiments, the valve mechanism is moved from its closed configuration to its open configuration in response to detaching the base portion 74 from the upper container 72 and the valve mechanism is moved from its closed configuration to its open configuration in response to attaching the base portion 74 to the upper container 72.

In further embodiments, additional pressure means are provided to apply pressure to the fluid in at least one of the upper container and base portion thereby by to control the flow of liquid between the upper container 72 and the base portion 74. For example, a negative pressure may be applied to move the liquid to the plurality of sample chambers.

In some embodiments, support means, for example, skirting, is provided so that the upper container can stand upright when the base portion is removed. In some embodiments, the support means is a skirt or stand. In some embodiments, the skirt is sized so that the base portion, when attached, is fitted to the skirt.

The valve mechanism may be implemented in different ways. In some embodiments, one or more closing members are provided that are sized to fully cover the opening when in the closed configuration. Any suitable valve mechanism may be used.

In use, a liquid sample is deposited in the upper collection portion 72 and distributed to the sample chambers of the base portion 74 via the valve mechanism and distribution mechanism. The base portion 74 is then removed from the upper portion 72 by twisting the base portion 74 relative to the upper portion 72 in a first direction (for example, anti-clockwise. The separate base portion 74 is then placed inside the detector apparatus, substantially as described above, having a single detection chamber, a coupling mechanism and drive arrangement. The sample chambers are moved, by rotating the separated base portion about its axis, so that each sample chamber of the base portion is successively placed in a coupling position with the detection chamber.

Following removal of the base portion 74, a further base portion may be attached to the same upper collection portion, to obtain further samples of the collected sample contained in the upper collection portion. Alternatively, the base portion 74 itself may be reattached to obtain further samples.

Figure 14A:
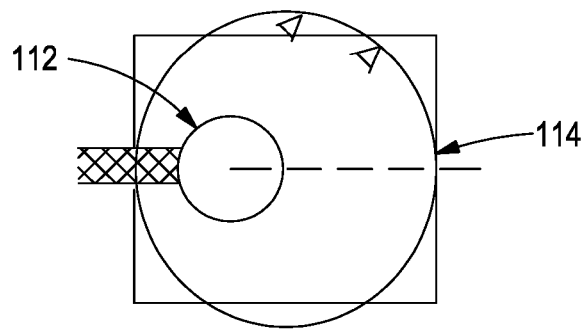
FIG. 14 is a schematic diagram illustrating a sample chamber of the base portion inside a detection chamber.
Figure 14B:
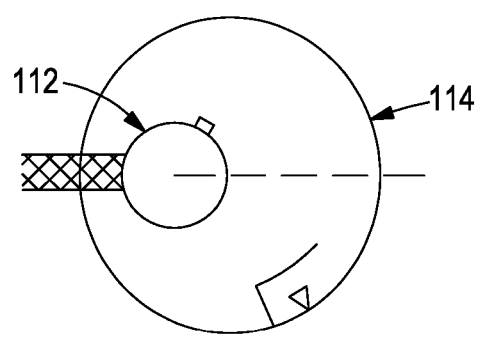

A sample chamber of the base portion is shown in FIGS. 14(a) and 14(b) inside the single detection chamber in accordance with some embodiments.

FIG. 14(a) show a spherical sample chamber 112 inside a spherical detection chamber 114. FIG. 14(b) also shows a spherical sample chamber 112 inside a spherical detection chamber 114. FIG. 14(a) only the outer, detection chamber 114 is a light integrating volume. In FIG. 14(b) both the inner, sampler chamber 112 and the outer, detection chamber 114 are light integrating volumes. A baffle is provided in FIG. 14(b) to protect the photodetector.

FIGS. 14(a) and 14(b) show laser light entering the detection chamber and being scattered by the sample in the sample chamber. FIGS. 14(a) and 14(b) show different positions for the photodetector.

In some embodiments, as shown in FIG. 14(a), the inner sample chamber 112 is coated in a reflective material and acts a light integrating volume. An aperture is provided for light to exit the inner sample chamber 112. In some embodiments, the aperture of the inner sample chamber is aligned with a photodetector provided on the inner surface of the outer detection chamber 114.

In some embodiments, as shown in FIG. 14(b), the inner sample chamber 112 is at least partially transparent. Scattered light exits the inner sample chamber 112 through the partially transparent surface of the sample chamber 112. The outer detection chamber acts as a light integrating volume. In these embodiments, a baffle is provided at the photodiode.

While spherical geometries are shown in FIG. 14 any shape of light integrating chamber may be used. For example, the cuboidal and L-shaped embodiments described above, may be used.

Any suitable speed may be used to successively place the sample chambers of the sample cassette into coupling positions with the detection chambers. For example, a typical rotation speed for the sample cassette inside the detection device is 480 rpm. A sample cassette with 8 sample chambers rotated at 480 rpm can have each sample chamber coupled and read at the detection chamber at a rate of one reading per second. Further control and read-out electronics are synchronised to the speed of rotation such that successive readings for each sample chamber can be performed.

Although in the above embodiments, the cassette and base portion are shown to be cylindrical or disc shaped, other geometries are possible. For example, a linear system may be provided, with sample chambers in a series.

Figure 16:
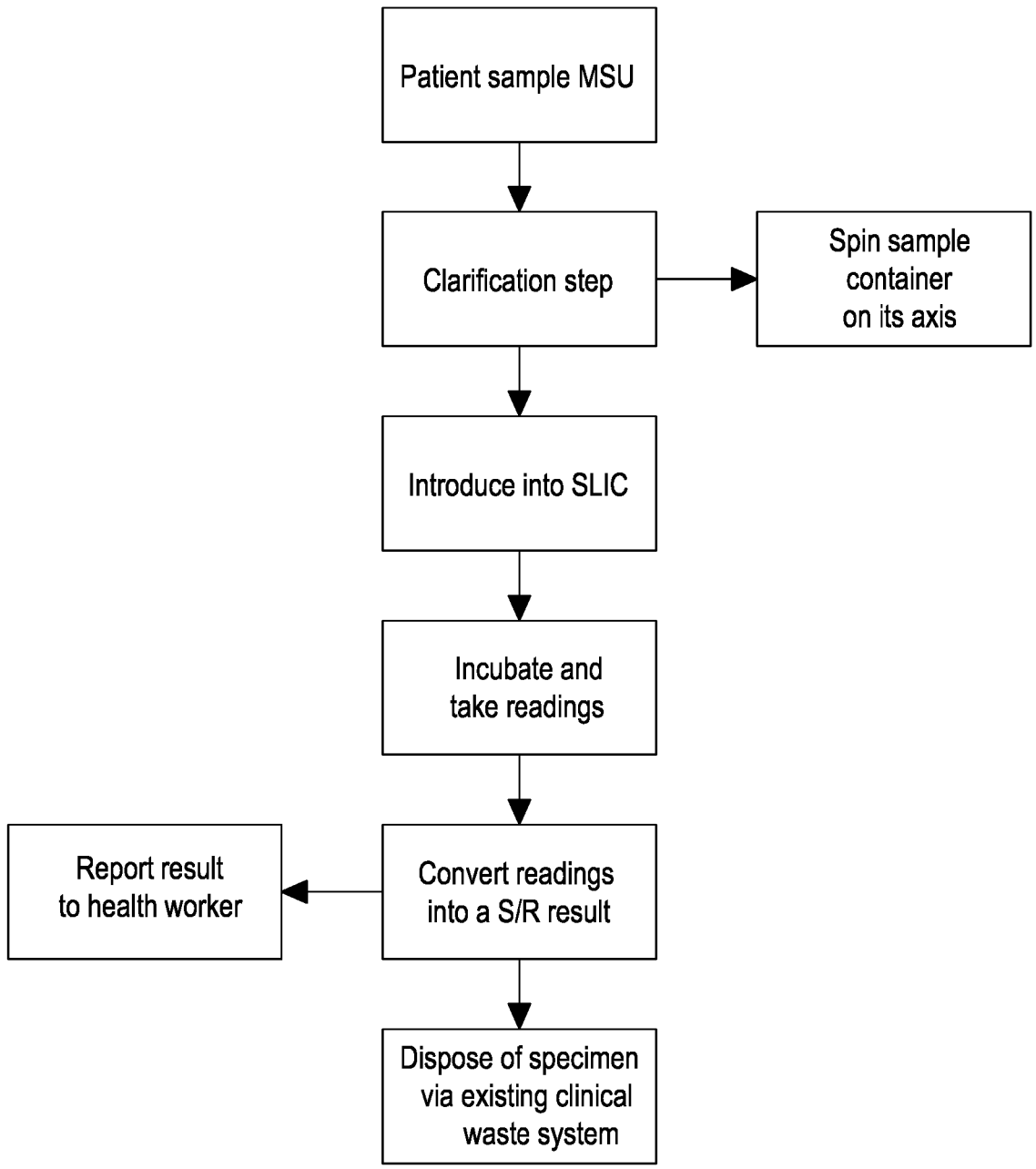
FIG. 16 is a flowchart of a method of using a detection apparatus with sample container.

FIG. 16 is a flowchart illustrating a method of using the detection apparatus together with the sample container. FIG. 16 is directed to methods using urine samples, however, other samples may be tested using the same or similar method.

At a first step, a patient sample is obtained. In this embodiment, the sample is a midstream specimen of urine (MSU). The specimen should then be examined immediately.

At a second step, the clarification step the sample in the sample container is spun on its axis. Proteins and cells in the sample are trapped and adhered to the adhesive inner surfaces. Cells and bacteria are repelled by the lower surface.

At a third step, a plurality of samples are introduced to a sample cassette for testing using the detection apparatus. In particular, the entrance to the sample cassette is opened, either manually or by an apparatus, and liquid is thereby introduced to the plurality of sample chambers of the sample cassette.

At a fourth step, a test process is performed that includes incubation and obtaining readings. Tests will typically run for a maximum of 30 minutes.

At a fifth step, an analysis process is performed based on the readings obtained from the test process. The analysis process includes determining if the strain is sensitive or resistant to the or an antibiotic or other agent in the sample chamber based on the obtained readings. Determining whether a sample is sensitive or resistant to an antibiotic or other agent may be referred to as obtaining an S result or an R result. Determining if a sample is a S result or an R result may include comparing a reading to threshold criteria.

As a first example, if the sample fails to show a 50% inhibition, the sample will be declared R after 30 minutes. In some embodiments, the analysis process includes providing sensitivity results.

The flowchart also has a next step, that includes reporting results to a health worker.

The final step includes disposing of the specimen in an existing clinical waste system. As there will be little change in total bacterial number all material can be disposed of as clinical waste.

A skilled person will appreciate that variations of the enclosed arrangement are possible without departing from the invention. Accordingly, the above description of the specific embodiment is made by way of example only and not for the purposes of limitations. It will be clear to the skilled person that minor modifications may be made without significant changes to the operation described.

What is claimed is:

1. A system for analysing a plurality of liquid samples comprising particles, the system comprising:
   a plurality of sample chambers, a detection chamber, and a coupling mechanism operable to place a sample chamber of the plurality of sample chambers into a coupled configuration with the detection chamber such that, in the coupled configuration, an optical path exists between said sample chamber and the detection chamber:

wherein each sample chamber comprises:
- a sample space for receiving a sample of the plurality of liquid samples;
- a light input for input of light into the sample chamber for interaction with the sample; and
- an exit aperture arranged for the light to pass from the sample chamber via the optical path to the detection chamber when said sample chamber is in the coupled configuration with the detection chamber;

wherein the detection chamber comprises:
- an input aperture for receiving light from the optical path when the sample chamber is in the coupled configuration with the detection chamber; and
- a detector for detecting, or a detector aperture for receiving, light to be detected;

wherein said sample chamber and the detection chamber comprise at least one light integrating volume, and wherein the sample chamber is configured such that in operation the sample is present in the sample chamber and isolated from the detection chamber.

2. The system as claimed in claim 1, wherein at least one of:
- the coupling mechanism is operable to sequentially place each sample chamber into the coupling configuration with the detection chamber;
- the coupling mechanism is operable to rotate the sample chambers; or
- the coupling mechanism comprises a carousel mechanism.

3. The system as claimed in claim 1, further comprising a driving arrangement arranged to drive the coupling mechanism, wherein the driving arrangement comprises a mechanical or electro-mechanical device.

4. A cuvette or other removable sample container configured for reception by the sample chambers of claim 1.

5. A system as claimed in claim 1, wherein at least one of a) or b):
a) the sample chamber further comprises a light beam exit port aligned with the light input and leading to a beam dump;
b) the light input comprises a light input aperture.

6. A system as claimed in claim 1, wherein the sample chamber is a light integrating chamber and the detection chamber is a light integrating chamber.

7. A system as claimed in claim 1, wherein walls of the sample chamber are reflective.

8. The system as claimed in claim 1, wherein the sample chamber is configured to receive a removable sample cell for containing the sample.

9. The system as claimed in claim 8, wherein at least one of:
- the sample space is configured such that the sample cell substantially fills the sample space when inserted; and
- the sample cell comprises at least one substantially opaque, reflective wall that includes at least one substantially transparent aperture arranged such that, when the sample cell is received in the sample chamber the aperture or at least one of the apertures of the sample cell is aligned with the light input of the sample chamber and/or such that the aperture or at least one of the apertures of the sample cell is aligned with the exit aperture of the sample chamber.

10. The system as claimed in claim 1, wherein the light input and the exit aperture are arranged such that, in operation, at least some of the light from the light input is reflected and/or scattered at least once before passing through the exit aperture.

11. The system as claimed in claim 1, wherein walls of the sample chamber are reflective such that in operation at least some of the light entering via the optical path undergoes at least one reflection before detection by the detector.

12. The system as claimed in claim 1, wherein walls of the sample chamber comprise a reflective material including titanium oxide, aluminum, or silver.

13. The system as claimed in claim 1 wherein walls of the sample chamber comprise a diffusive coating configured to produce diffuse light.

14. The system as claimed in claim 1, wherein the detector comprises a light receiving element.

15. The system as claimed in claim 14, wherein the arrangement of the optical path and the detection chamber defines an optical axis from the input aperture to a point or region on a wall of the detection chamber opposing the input aperture, and the light receiving element of the detector is located in an off-axis position with respect to said optical axis.

16. The system as claimed in claim 1, wherein at least one of:
- the light input comprises, or is configured to receive light from a light source, a laser and/or an LED;
- the light input comprises, or is configured to receive light from, a light source and the light source is configured to input light with a known modulation.

* * * * *